United States Patent [19]
Kurauchi et al.

[11] Patent Number: 5,917,572
[45] Date of Patent: *Jun. 29, 1999

[54] LIQUID CRYSTAL DISPLAY DEVICE COMPRISING SWITCHING ELEMENTS OF REVERSE STAGGER TYPE AND COMMON ELECTRODE FORMED OVER THE ENTIRE SURFACE OF THE SUBSTRATE INCLUDING SPACERS THAT ARE CONSTRUCTED OF STACKED COLOR FILTER LAYERS

[75] Inventors: Shoichi Kurauchi; Daisuke Miyazaki; Hitoshi Hatoh; Muneharu Akiyoshi; Teruyuki Midorikawa, all of Kanagawa-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/700,078

[22] Filed: Aug. 20, 1996

[30] Foreign Application Priority Data

Aug. 21, 1995 [JP] Japan ................................ 7-212192
Sep. 6, 1995 [JP] Japan ................................ 7-229504

[51] Int. Cl.[6] .................. G02F 1/1343; G02F 1/136; G02F 1/1339
[52] U.S. Cl. ................... 349/156; 349/39; 349/42; 349/43
[58] Field of Search .................. 349/39, 155, 42, 349/43, 156

[56] References Cited

U.S. PATENT DOCUMENTS

| 4,938,566 | 7/1990 | Takeda et al. | 349/39 |
| 5,414,278 | 5/1995 | Kobayashi et al. | 349/43 |

FOREIGN PATENT DOCUMENTS

| 56-38008 | 4/1981 | Japan . | |
| 59-139018 | 8/1984 | Japan . | |
| 61-7823 | 1/1986 | Japan . | |
| 62-000919 | 1/1987 | Japan | 349/155 |
| 4-093924 | 3/1992 | Japan | 349/155 |
| 7-281195 | 10/1995 | Japan . | |

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

A spacer is constructed of a stacked colored layers constituting color filters and is disposed in such a position as to exhibit a high dielectric breakdown strength on an active matrix substrate. A display performance is enhanced because of using no plastic beads, and insulation can be maintained. When the spacer assumes an inversely tapered shape, a contact position of the spacer can be freely selected because of forming no conductive layer on side surfaces.

58 Claims, 18 Drawing Sheets

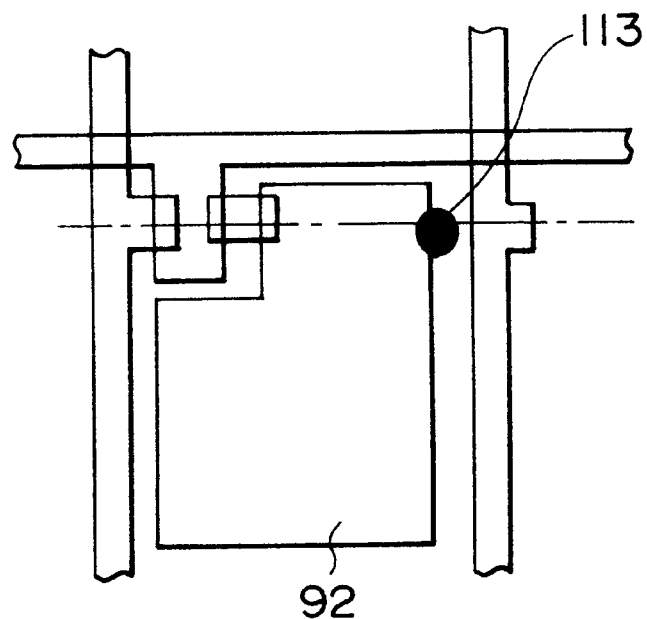
F I G. 11
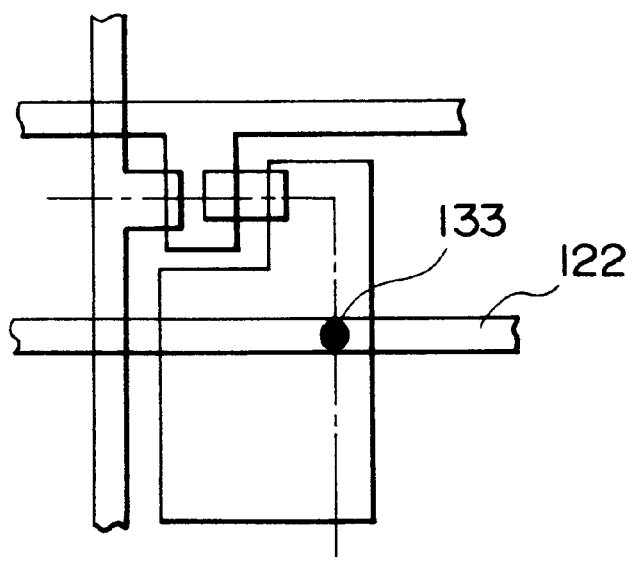
F I G. 13

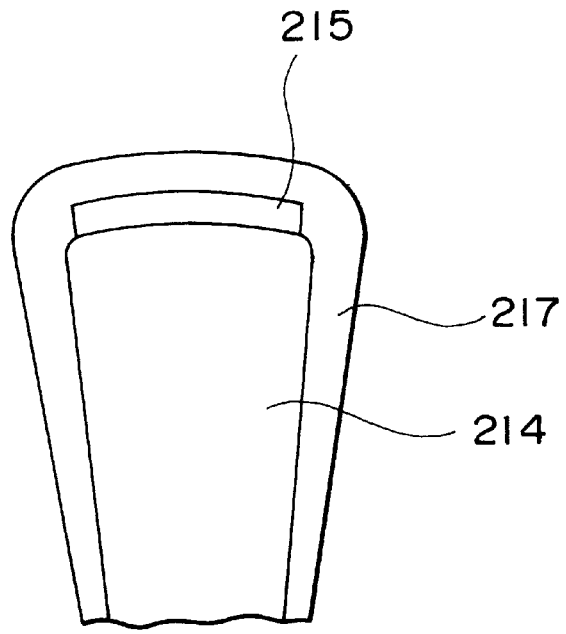
F I G. 24
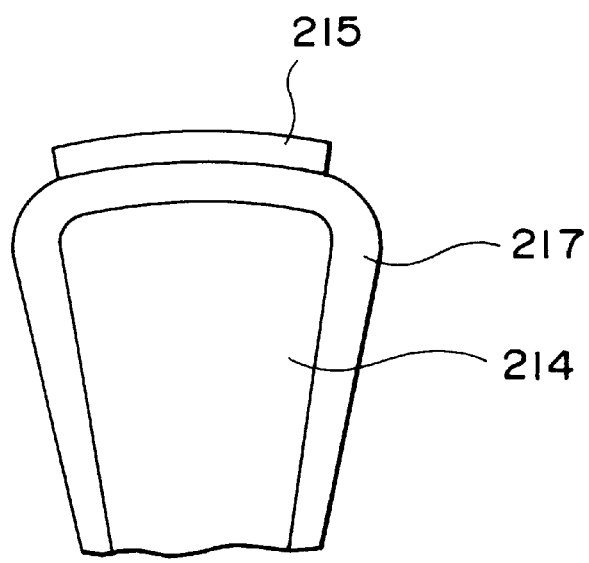
F I G. 25

LIQUID CRYSTAL DISPLAY DEVICE COMPRISING SWITCHING ELEMENTS OF REVERSE STAGGER TYPE AND COMMON ELECTRODE FORMED OVER THE ENTIRE SURFACE OF THE SUBSTRATE INCLUDING SPACERS THAT ARE CONSTRUCTED OF STACKED COLOR FILTER LAYERS

BACKGROUND OF THE INVENTION

1. Field of the Invention

The present invention relates generally to a liquid crystal display device and, more particularly, to a liquid crystal display device exhibiting a high display performance and a high yield and requiring a small number of manufacturing process steps.

2. Description of the Background Art

A liquid crystal display device generally employed nowadays is constructed such that two glass substrates having electrodes are set in a face-to-face (opposing) relationship, peripheries of these two substrates exclusive of a liquid crystal filling port are fixed by a bonding agent, a liquid crystal is interposed between the two substrates, and the liquid crystal filling port is sealed by a sealing agent. Plastic beads or the like having a uniform particle diameter are dispersed between the substrates as spacers for keeping a fixed distance between these two substrates.

A liquid crystal display device for color display includes color filters R, G and B of colored layers that are disposed on one of the two glass substrates. For instance, a color dot matrix liquid crystal display device of a simple matrix driving includes a Y-substrate having Y-electrodes subjected to band-like patterning in a lateral (Y) direction and an X-substrate having colored layered under the X-electrode subjected to the band-like patterning in a vertical (X) direction, wherein the X- and Y-substrates are provided in an opposing relationship so that the X- and Y-electrodes are substantially orthogonal to each other, and a liquid crystal composition is sealed therebetween. The liquid crystal display device may involve the use of display systems such as, e.g., TN (Twisted Nematic) type, STN (Super Twisted Nematic) type, GH (Guest Host) type, or ECB (Electrically Controlled Birefringence) type and a dielectric liquid crystal. The sealing agent involves the use of, e.g., a bonding agent of a thermosetting type or an ultraviolet ray hardening acrylic or epoxy group.

Furthermore, the color active matrix drive liquid crystal display device is constructed of a TFT array substrate, i.e., an active matrix substrate formed with a switching element, e.g., a thin-film transistor (TFT) with a semiconductor layer composed of amorphous silicon (a-Si), and a pixel electrode, a signal line and a gate line that are connected thereto, and also an opposite substrate disposed in the opposing relationship with the TFT array substrate. The color filters R, G and B are formed on the opposite substrate. Disposed on a screen peripheral portion is a silver paste serving as an electrode transfer member (transfer) for applying a voltage to the opposite substrate from above the active matrix substrate. The two substrates are electrically connected by this electrode transfer member, and the liquid crystal composition is sealed in between those two substrates. Furthermore, polarizing plates are secured on both side of those two substrates.

In the liquid crystal display device using the plastic beads as a spacer, however, alignments of the liquid crystal around the spacers, which are scattered in the liquid crystal between the two substrates, are disordered, resulting in such a problem that the contrast ratio declines due to a leakage of light beams from the spacer peripheral portion. Moreover, the spacers are hard to disperse uniformly and are arranged with ununiformity during a step of dispersing the spacers on the substrate. This results in a display defect, which in turn brings about a decreases in yield.

Under such circumstances, there is proposed a liquid crystal display device using no plastic beads, wherein a pillar-shaped spacer is formed by stacking a plurality of colored layers of color filters on the TFT portion.

Furthermore, it is also proposed that the pillar-shaped spacer composed of the colored layers is disposed on a gate line or signal line among the lines for the active matrix, and that the pillar-shaped spacer is formed on a non-pixel portion by use of a photo resist.

There arises, however, a problem in which, in a liquid crystal display device which is formed by forming pillar-shaped spacers on a color filter substrate and a common electrode are formed on the whole of the substrate including the pillar-shaped spacers, since ITO (Indium Tin Oxide) film as a common electrode is formed at tip and side portions of the pillar-shaped spacers, there occurs a short circuit between the ITO film and wirings/electrodes of the active matrix substrate resulting in display defect.

Moreover, it is difficult to reduce an area size of a non-display area of the liquid crystal display device in terms of arranging the electrode transfer member on the screen peripheral portion.

SUMMARY OF THE INVENTION

It is a primary object of the present invention to provide a color liquid crystal display device capable of exhibiting a high display performance.

It is another object of the present invention to provide a color liquid crystal display device capable of showing a high manufacturing yield.

It is still another object of the present invention to provide an inexpensive color liquid crystal display device requiring a less number of steps.

According to the present invention, in a liquid crystal display device where pillar-shaped spacers are formed on a color filter substrate and common electrodes are formed on the whole of the substrate including the pillar-shaped spacers, the spacers are disposed in such a position as to exhibit a high dielectric breakdown strength of the active matrix substrate. More specifically, there are cases where the spacers are disposed on a lower layer electrode line, on an intermediate layer electrode line and on an upper layer electrode line, where the spacers are disposed in a non-pixel/non-boundary portion between the non-pixel portion and the pixel portion. In each case, spacers contact to an insulating film formed on the active matrix substrate.

A display performance is thereby enhanced without using the plastic beads, which entails an improvement of an insulating property of the spacer portion and stably keeping a distance between an active matrix substrate and an opposite substrate. It is also possible to make manufacturing easier, increase a yield and reduce costs.

Furthermore, according to the present invention, the spacer takes an inversely tapered shape in section. Hence, it is feasible to prevent an unnecessary electric capacitance or electrical short circuit which may be caused between the common electrode on a spacer and wiring/electrode provided on the active matrix substrate, from being produced by inhibiting a conductive film from being formed on side surfaces of the spacer.

Moreover, the spacer taking the inversely tapered shape is formed so that an upper layer of pillar-shaped colored layers has a larger diameter when forming color filters, whereby the spacer can be formed simultaneously with the color filters.

Still further, a cylindrical wall body disposed concentrically lower than a height of the pillar-shaped spacer is provided on an outer periphery of the pillar-shaped spacer, whereby an adhesion of the conductive film to the side surface of the spacer can be prevented. A pillar-shaped barrier lower than the height of the pillar-shaped spacer is provided in an entrance-side position in an orientation processing direction of an aligning film with respect to the pillar-shaped spacer, thereby making it possible to prevent the pillar-shaped spacer from coming off due to an external force of rubbing when executing the orientation process by rubbing of the aligning film. The reliability can be thus increased.

BRIEF DESCRIPTION OF THE DRAWINGS

Other objects and advantages of the present invention will become apparent during the following discussion in conjunction with the accompanying drawings, in which:

FIG. 11 is a plan view of the device, showing a sectional portion of FIG. 10;

FIG. 13 is a plan view of the device, showing a sectional portion of FIG. 12;

FIG. 24 is a partial enlarged view illustrating a spacer portion; and

FIG. 25 is a partial enlarged view illustrating the spacer portion.

DESCRIPTION OF THE PREFERRED EMBODIMENTS

Some of embodiments of the present invention will hereinafter be described in detail.

Figure 1:
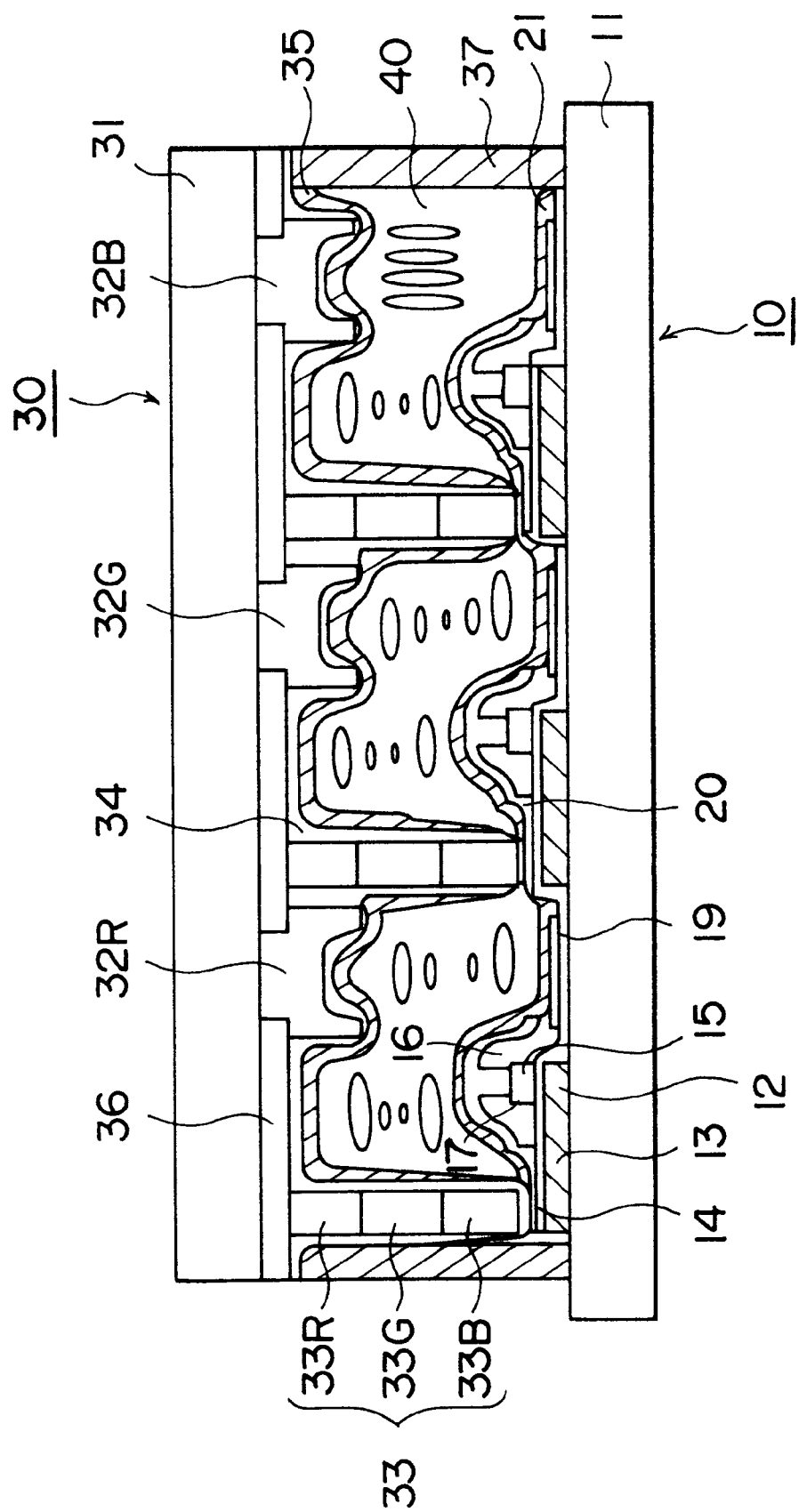
FIG. 1 is a sectional view schematically illustrating a construction of a liquid crystal display device according to a first embodiment of the present invention.

FIG. 1 is a sectional view illustrating an active matrix liquid crystal display device in accordance with a first embodiment of the present invention. This sectional view contains, as a principal portion, elements along the cutting plane line, i.e., the one-dotted chain line in a plan view shown in FIG. 2. This liquid crystal display device is constructed such that an active matrix substrate 10 is disposed in a face-to-face relationship with an opposite substrate 30, and a liquid crystal composition 40 is sealed in therebetween.

Figure 2:
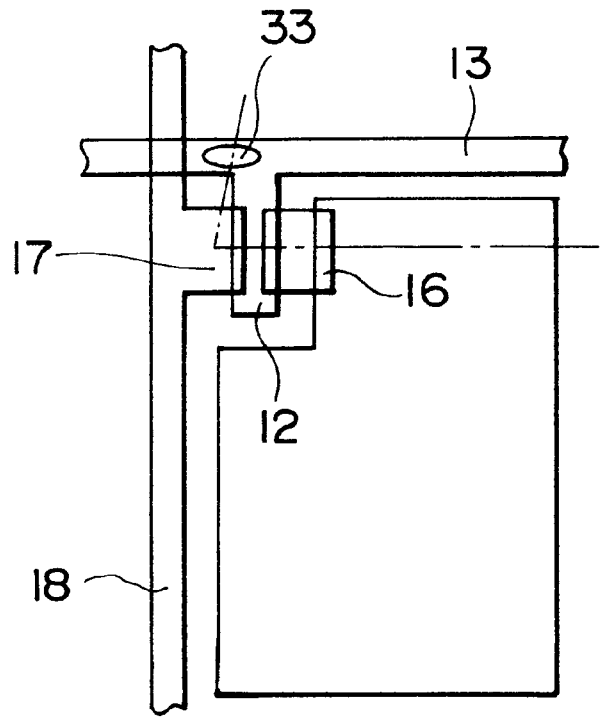
FIG. 2 is a plan view of the device, showing the sectional potion of FIG. 1.
Figure 3:
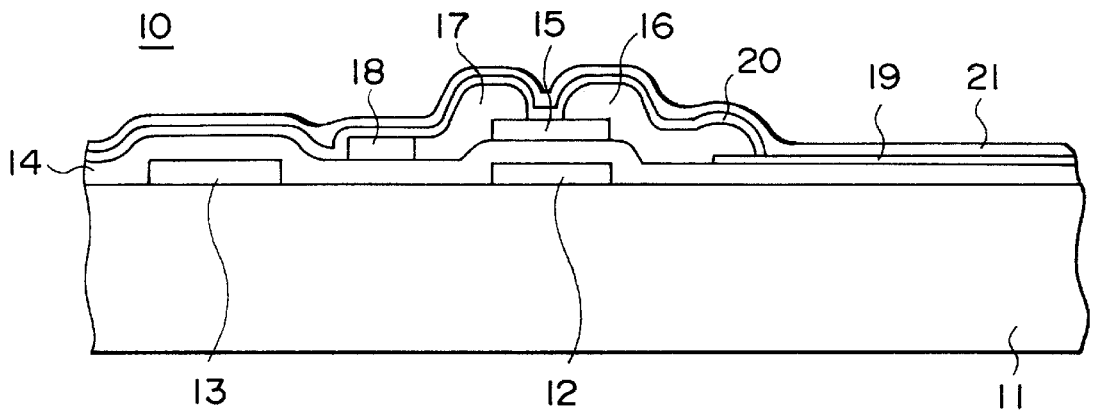
FIG. 3 is a sectional view schematically illustrating a construction of the active matrix substrate used in the liquid crystal display device of FIG. 1.

FIG. 3 is a sectional view illustrating minute details of a configuration of the active matrix substrate 10 used for the liquid crystal display device shown in FIG. 1. This sectional view contains, as a principal portion, elements along a cutting plane line, i.e., a one-dotted chain line in the plan view shown in FIG. 2.

Figure 4:
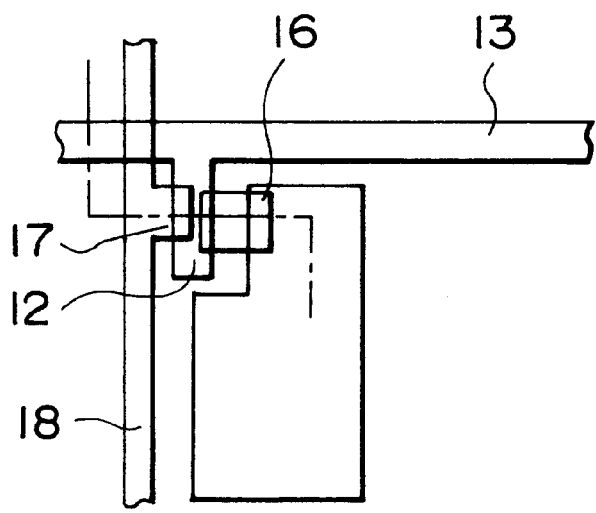
FIG. 4 is a plan view of the device, showing a sectional portion of FIG. 3.

FIG. 3 is a view corresponding to a plan view shown in FIG. 4. The active matrix substrate has such a structure that a TFT portion is known as an reverse stagger type. The TFT portion on the side of a main surface of a glass substrate 11 is provided with a gate electrode 12, while a wiring portion is provided with a gate line 13. An insulating film 14 composed of silicon nitride is deposited thereon. A semiconductor film 15 composed of amorphous silicon is formed upwardly of the gate electrode 12 above that insulating film 14. A source 16 and a drain 17 are formed over the semiconductor film 15 and the insulating film 14 in such a manner that the source 16 and the drain 17 are disposed in the face-to-face relationship and spaced at a predetermined distance at a central portion of the semiconductor film 15. A signal line 18 is so formed as to be coupled with the drain 17, while a plurality of pixel electrode 19 is so formed as to be coupled with the source 16. Then, a protective film 20 composed of silicon oxide is formed over an entire surface of the wiring portion as well as of the TFT portion, thus forming an aligning film 21 over an entire surface of the active matrix substrate. Note that the same elements in FIG. 3 as those shown in FIG. 1 are marked with the like reference numerals, but some configurations are changed for making it easier to understand the invention.

Referring again to FIG. 1, the upper opposite substrate 30 includes red, green and blue color filters 32R, 32G and 32B formed corresponding to pixel positions on the glass substrate 31. In portions between either two of these, a light shield film is provided. Further, color filter materials thereof are stacked, thus forming a pillar-shaped spacer 33. This spacer 33 is constructed of a red layer 33R, a green layer 33G and a blue layer 33B that correspond to the color filters 32R, 32G and 32B. then, a common electrode film 34 and an aligning film 35 are disposed over the whole surface thereof.

The two substrates are disposed in the face-to-face relationship, and the spacer 33 of the opposite substrate 30 contacts the gate line 13 of the active matrix substrate 10. As understood from FIG. 1, two-layered insulating layers 14 and 20 exist on the gate line defined as the lower layer, and there is very little possibility in which a defect such as short-circuit is caused due to a spoiled insulating property even if the spacer 33 contacts. Then, the liquid crystal composition 40 fills and is sealed in between the two substrates.

Given next is an explanation of a method of manufacturing such a liquid crystal display device.

To start with, as in the same way with a process of normally forming TFT, a film formation and patterning are repeated on a #7059™ glass substrate 11 having a thickness of 1.1 mm and made by CORNING CORP., thus forming a thin-film transistor and an electrode wire in matrix. It is herein assumed that an active matrix substrate 10 having totally 10000 pixels, with one set of 100 pixels arrayed lengthwise and another set of 100 pixels arrayed crosswise, respectively, and also an amorphous silicon TFT array. This active matrix substrate includes the gate line disposed as the lower layer, and the two-layered insulating films 14 and 20 are formed thereon. Thereafter, AL-1051™ (made by JAPAN SYNTHETIC RUBBER CO., LTD.) serving as an aligning film material is coated to have a thickness on the order of 500 Å over the whole surface, and a rubbing process is executed, thereby forming an aligning film 21.

Next, the opposite substrate 30 is formed in the following manner.

Photosensitive black resin CK-2000™ (made by FUJI-HUNT ELECTRONICS TECHNOLOGY CO., LTD.) is coated by use of a spinner over the #7059™ substrate 31 having a thickness of 1.1 mm and made by CORNING CORP., and, after being dried at 90° C. for 10 minutes, this is exposed with an exposure quantity of 300 mj/cm$^2$ at a wavelength of 365 nm by employing a photo mask having a predetermined pattern configuration. Thereafter, the material is developed in an alkali aqueous solution of pH 11.5 and thermally hardened at 200° C. for 60 minutes, thereby forming a light shield layer 36 having a film thickness of 2.0 $\mu$m. Subsequently, ultraviolet ray hardening acrylic resin resist CR-2000™ (made by FUJI-HUNT ELECTRONICS TECHNOLOGY CO., LTD.) with a dispersion of a red pigment is coated over the whole surface by use of the spinner. A predetermined area for forming the spacer and a predetermined area for forming the red filter are irradiated on the order of 100 mJ/cm$^2$ at a wavelength of 365 nm by use of such a photo mask as to irradiate these areas with light beams. Effected subsequently is a development in KOH 1% aqueous solution for 10 sec, whereby a red-colored layer is formed thereon. Herein, the position for disposing the spacer is set relative to the gate line of the face-to-face active matrix substrate as well as being set in such a portion where there is no overlapped portion with the signal line, TFT and the pixel electrode. The reason for this is that at least the two-layered insulating layers 14 and 20 are formed on the gate line defined as the lower layer on the active matrix substrate, and hence there is very little possibility in which the insulation is spoiled due to the contact with the spacer.

Similarly, the green-colored and blue-colored layers are coated, exposed and developed, thereby forming the spacers and the color filters, and finally they are thermally hardened at 230° C. for an hour. Herein, the green coloring material involves the use of CG-2000™ (made by FUJI-HUNT ELECTRONICS TECHNOLOGY CO., LTD.), and the blue-colored layer involves the use of CB-2000 (made by FUJI-HUNT ELECTRONICS TECHNOLOGY CO., LTD.). Thereafter, an ITO film as the common electrode 34 is formed to have a thickness on the order of 1500 Å by a sputtering method, and the same aligning film material is formed thereon. Thereafter, the rubbing process is executed, thus forming the aligning film 35.

After this process, a bonding agent 37 is printed, excluding a liquid crystal filling port (unillustrated), along the periphery of the aligning film 35 of the opposite substrate 30, and an electrode transfer member for applying a voltage to the face-to-face electrode from the active matrix substrate is formed on an electrode transfer electrode in the vicinity of the bonding agent 15. Next, the aligning films 21 and 35 of the two substrates are disposed in the face-to-face relationship, and further the substrates 10 and 30 are so disposed that rubbing directions thereof are set at 90 degrees, respectively. Then, the bonding agent is hardened by heating, thus stacking the substrates 10 and 30 with each other. Next, a liquid crystal composition 40 obtained by adding S811™ of 0.1 wt % to ZLI-1565™ (made by E. MERCK CO., LTD.) is filled via the filling port by an ordinary method, and thereafter the filling port is sealed by the ultraviolet ray hardening resin.

The thus formed color display type active matrix liquid crystal display device is capable of exhibiting a high contrast ratio and obtaining a high-quality display and a high-trustworthiness because of using no plastic beads.

The materials explained in this embodiment and applicable in a subsequent embodiment are not limitative but may be usable for others. For instance, a non-photosensitive material is also usable as a block resin for forming the light shield layer. Further, the acrylic resin with the dispersion of the pigment serving as a coloring material for forming the colored layer may involve the Pic Red02™ for red, Pic Green02™ for green, and Pic Blue02™ for blue (all these materials are made by BREWER SCIENCE INC.).

Note that the active matrix substrate has such a structure that the TFT portion is known as the reverse stagger type in this embodiment, and the tip of the spacer contacts onto the gate line. Generally, however, the spacer may contact onto a storage capacitance line formed during a formation process of the gate line and may contact the lower layer and portion where no other wiring or electrode are not disposed of a different type of active matrix substrate, whereby the same effects can be expected.

In the case that a spacer is disposed on a storage capacitance line and at a position where no other wiring or electrode are not formed, there occurs no problem even if a short-circuit between the storage capacitance line and the common electrode on the spacer. The reason is, since the same potential is given to the storage capacitance line and the common electrode, no problem will occur. Therefore, no problem will occur as far as disposing a spacer on an auxiliary capacitance line, even if the storage capacitance line is not the lower layer.

According to this embodiment, on the gate line or storage capacitance line which are the lower layer to which the spacer contacts, there are formed two-layer insulating films of oxide and nitride films, however, at least one insulating film will function well.

Furthermore, according to this embodiment, since a spacer is provided on the lower wiring layer which is nearest wiring layer among wiring layers formed on an active matrix substrate, and no conductive material such as other wiring or electrode are not formed thereon, the spacer is disposed at a position where an oxide film or nitride film, etc. which exhibits high dielectric strength is formed. This prevents a common electrode disposed on the spacer from being short-circuited to the lower layer. Still further, if the spacer is disposed on the lower wiring layer, at least two insulating films, such as a first insulating film formed on the lower wiring layer and a second insulating film formed on other wiring layer (signal line, in this embodiment), are formed. Accordingly, the possibility of occurring short-circuit will be lowered comparing to the case where a spacer is disposed on a signal line which is not the lower layer.

Figure 5:
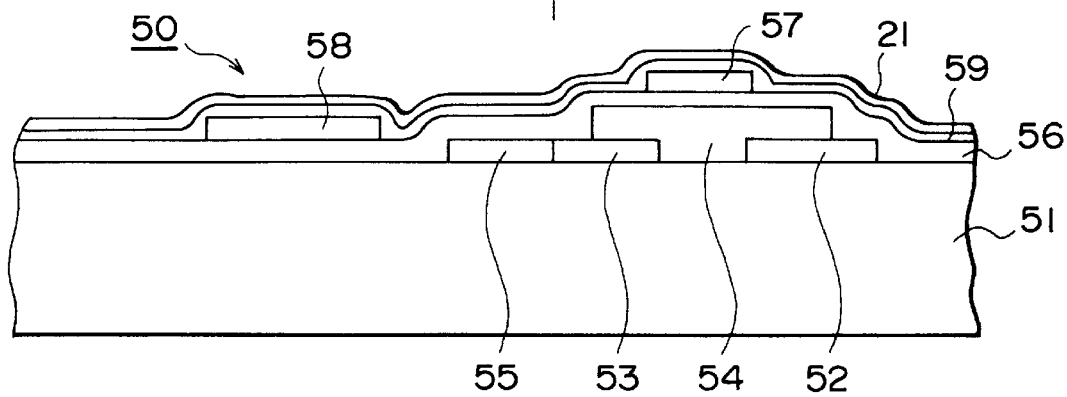
FIG. 5 is a sectional view of the device, illustrating a structure of an active matrix substrate of a positive stagger type according to a second embodiment of the present invention.

FIG. 5 shows a sectional structure of an active matrix substrate 50 termed a positive stagger type in accordance with a second embodiment. A source 52 and a drain 53 are disposed in the face-to-face relationship and spaced at a predetermined distance on the TFT portion on the main surface side of the glass substrate 51. A semiconductor film 54 composed of amorphous silicon is formed between the source 52 and the drain 53 and over some portions of the source and the drain. A signal line 55 is so formed as to be coupled with the drain 53. An insulating film 56 is deposited on the entire surfaces thereof. A gate electrode 57 is formed on the insulating film 56 upwardly between the source and the drain that have been previously explained. Further, a gate line 58 is disposed on the insulating film 56. Then, an insulating film 59 is formed on the entire surface of the wiring portion which is composed of signal lines and gate lines as well as on the entire surface of the TFT portion. Further, as in the case of FIG. 3, the aligning film 21 is formed on the whole surface of the pixel portion.

When using the above-mentioned positive stagger type active matrix substrate, the position to make the spacer contact is set to a signal line 55 defined as the lower layer. In this case also, two-layered insulating layers 56 and 59 are formed on the signal line 55, and, when the spacer is made to contact to the active matrix substrate, there is the least possibility in which the insulating property might be deteriorated.

Note that the spacer exhibits a more stable function as an area size becomes larger in terms of examining the area size on the wiring layer of the lower layer with which the spacer is made to contact to the active matrix substrate.

If too large, however, a parasitic capacitance which is generated between a gate line and a common electrode formed on the spacer is not ignorable, resulting in an occurrence of rounding in the applied voltage waveform and also a delay. This further conduces to a deterioration in display characteristics. It is therefore desirable that the area size be not more than twice as large as a total area size of a switching element, e.g., a transistor. For keeping a substrate-to-substrate distance stably, however, it is required that the total area size on the wiring layer of the lower layer with which the spacer comes into contact be above $\frac{1}{20}$ the total area size of, the switching element, e.g., the transistor. Note that the area size of the switch element herein indicates an area size of the semiconductor layer.

Further, the number of the spacers which contact onto the wiring layer of the lower layer is required to be a number corresponding to the number of switching elements, e.g., the transistors, and a fixed number corresponding to a size of the whole is needed at the edge portions of the matrix. Hence, it is obvious that it must be in a relationship of a linear function with respect to the number of the switching elements, e.g., the transistors, and therefore spacers in display area disperse homogeneously resulting in uniform cell gaps.

According to the embodiment discussed above, the spacer is arranged to make contact with the wiring layer of the lower layer but may contact with other layers if in such a position as to exhibit a high dielectric breakdown strength. The following are some of such embodiments.

Figure 6:
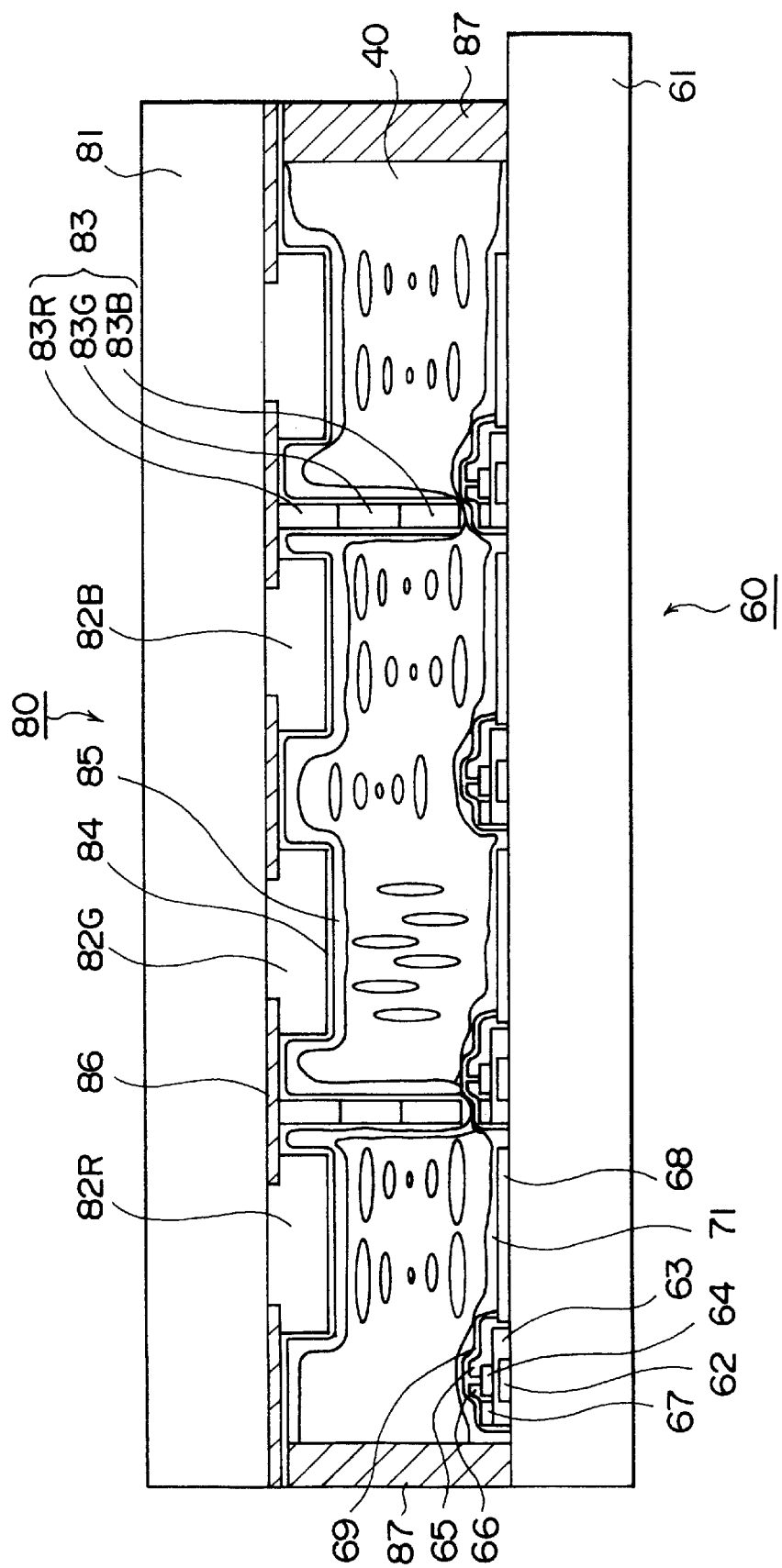
FIG. 6 is a sectional view of the device, illustrating a structure of an active matrix substrate of a reverse stagger type according to a third embodiment of the present invention.
Figure 7:
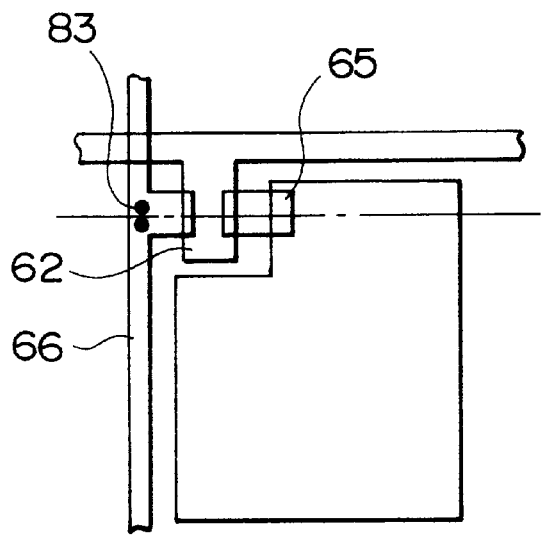
FIG. 7 is a plan view of the device, showing a sectional portion of FIG. 6.

FIG. 6 is a sectional view illustrating the active matrix liquid crystal device in accordance with a third embodiment of the present invention. This sectional view contains, as a principal portion, elements along the cutting plane line, i.e., the one-dotted chain line in a plan view shown in FIG. 7.

This liquid crystal display device is constructed such that an active matrix substrate 60 of the reverse stagger type is disposed in the face-to-face relationship with an opposite substrate 80, and the liquid crystal composition 40 is sealed in therebetween.

The active matrix substrate 60 has a TFT portion based on the reverse stagger structure, and a gate electrode 62 is disposed on the TFT portion on the main surface side of a glass substrate 61. Then, an insulating film 63 of silicon nitride is deposited on the gate electrode. A semiconductor film 64 composed of amorphous silicon is formed on this insulating film 63 upwardly of the gate electrode 62, and a source 65 and a drain 66 are formed astride the semiconductor film 64 and the insulating film 63 in such a manner that the source 65 and the drain 66 are disposed in the face-to-face relationship and spaced at a predetermined distance at a central portion of the semiconductor film 64. A signal line 67 is so formed as to be connected to a drain 66, and a pixel electrode 68 is so formed as to be connected to the source 65. Then, an insulating film 69 is formed on the entire surface of the TFT portion, and an aligning film 71 is formed on the whole surface of the pixel portion. As apparent from FIG. 6, a gate electrode 62 is positioned under a signal line 67 which is the upper wiring layer.

Further, an opposite substrate 80 includes red, green and blue color filters 82R, 82G and 82B that are formed corresponding to pixel positions on the glass substrate 81. Further, these color filter materials are stacked, thus forming a pillar-shaped spacer 83. This spacer 83 is constructed of a red layer 83R, a green layer 83G and a blue layer 83B which correspond to the color filters 82R, 82G and 82B. Then, a common electrode 84 and an aligning film 85 are deposited over the entire surface thereof, and a black matrix 86 defined as a light shield film is disposed between neighboring one of the color filters.

The two substrates 60 and 80 are disposed in the face-to-face relationship and fixed by bonding agent 87. Then, the liquid crystal composition 40 fills and is sealed in between the two substrates.

According to this embodiment, since a spacer is disposed on an upper wiring layer which is farthest layer from the active matrix substrate among wiring layers formed on the active matrix substrate and there is not formed any conductive material such as other wiring layer or electrode but formed inorganic insulating film such as nitride film to have high dielectric strength, short-circuit between an common electrode formed on the spacer and the signal line which is the upper wiring layer.

Figure 9:
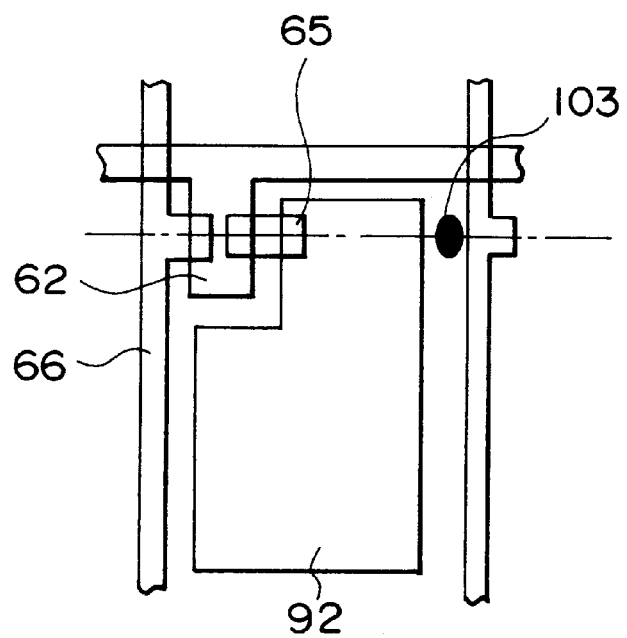
FIG. 9 is a plan view of the device, showing a sectional portion of FIG. 8.
Figure 8:
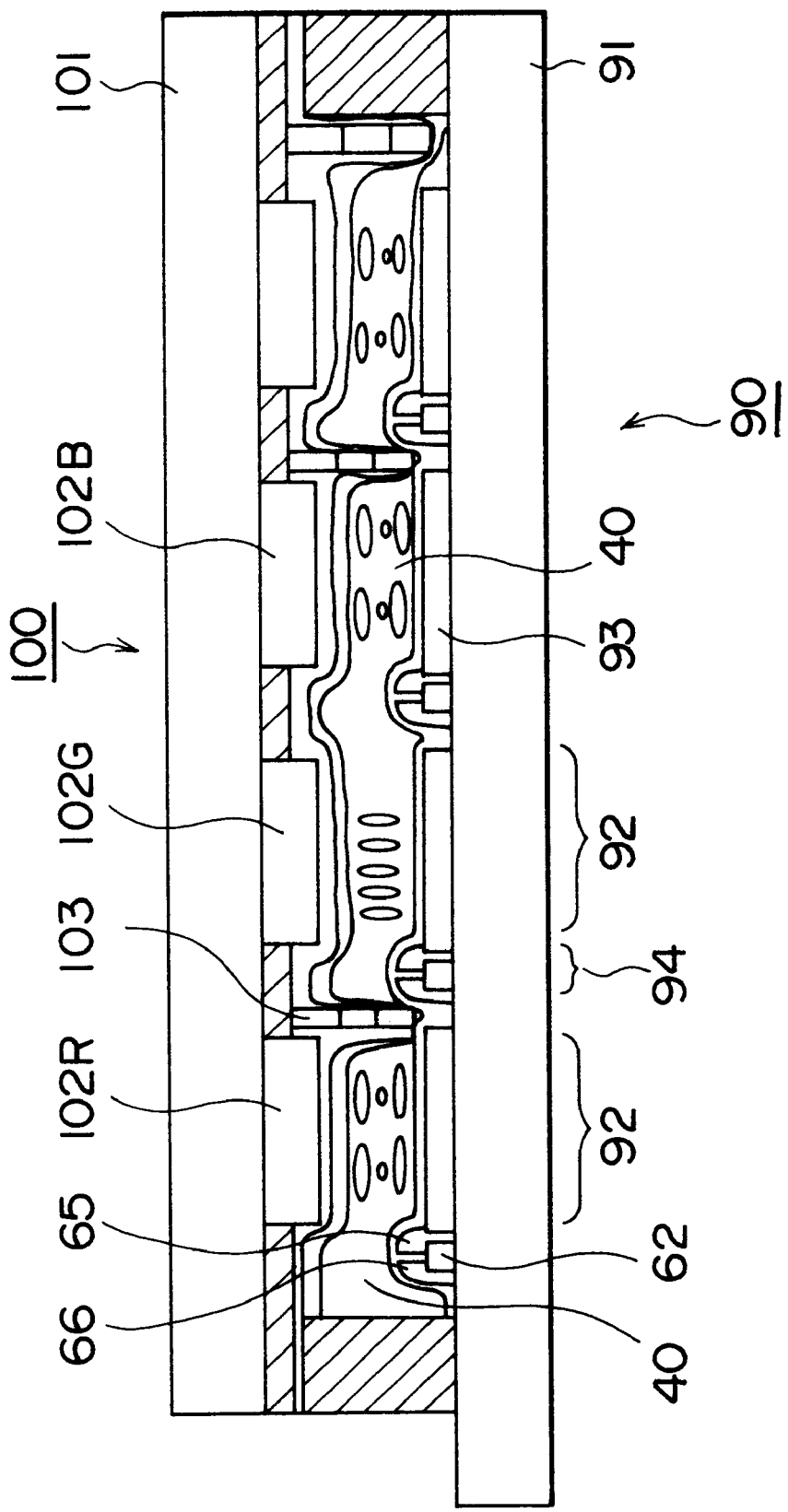
FIG. 8 is a sectional view of fourth embodiment of the liquid crystal display device according to the present invention but schematically shows a construction of the embodiment in which the spacer is brought into contact with a non-pixel/non-wired area.

FIG. 8 is a sectional view illustrating the active matrix liquid crystal device in a fourth embodiment of the present invention. This sectional view corresponds to a plan view sown in FIG. 9.

This liquid crystal display device is constructed such that an active matrix substrate 90 of the reverse stagger type is disposed in a face-to-face relationship with an opposite substrate 100, and the liquid crystal composition 40 is sealed in therebetween.

The active matrix substrate 90 is constructed by repeatedly forming a pixel area 92 where a pixel electrode 93 exists on the main surface of the glass substrate 91 and also an element area formed with TFT.

The opposite substrate 100 includes red, green and blue color filters 102R, 102G and 102B that are formed corresponding to the pixel positions on the glass substrate 101. Further, these color filter materials are stacked, thus forming a pillar-shaped spacer 103.

Then, the spacer contacts the active matrix substrate in the non-wiring area between the pixel area and the element area. However, such a non-pixel/non-wiring area is extremely narrow, and hence it is required that a diameter of the spacer be set to 3–4 μm.

In manufacturing a liquid crystal display device having reverse stagger type structure, after forming a source, a drain and a signal line in the same layer, pixel electrodes are formed, thereafter an insulating film is formed on entire surface, then the insulating film which has a configuration which corresponds to the pixel electrode pattern is removed. In the step of forming the pixel electrodes, it is to be noted that the pixel electrodes and the gate line may not be in short-circuit. In the step of forming a gate line, it is necessary to keep a distance between the pixel electrode and the signal line as 5 μm which is larger than the distance of 4 μm required for between the pixel electrode and the gate line, because the pixel electrode is formed on the gate line disposing an insulating film therebetween. In such a design, it is preferable to dispose the spacer in a broader area between the pixel electrode and the gate line than an rear between the pixel electrode and the signal line to effectively reduce short-circuit between the pixel electrode and the common electrode on the spacer.

This fourth embodiment has absolutely no possibility of causing the short-circuit and is capable of keeping a high reliability.

Figure 10:
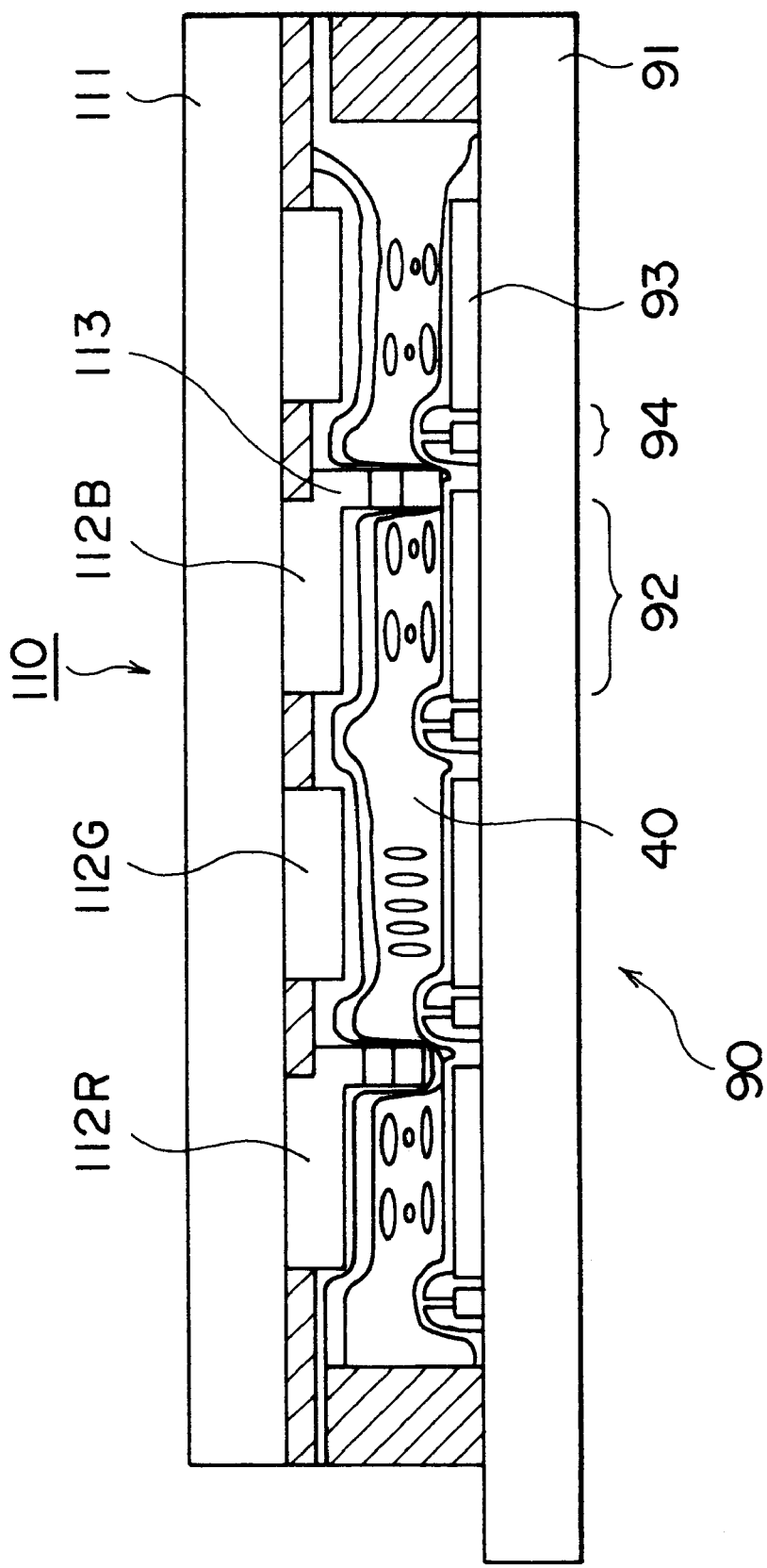
FIG. 10 is a sectional view of a fifth embodiment of the liquid crystal display device according to the present invention but schematically shows a construction of the embodiment in which the spacer contacts astride the non-pixel area and the pixel area.

FIG. 10 is a sectional view illustrating the active matrix substrate in a fifth embodiment of the present invention, wherein the pillar-shaped spacers provided on the opposite substrate contact with both of the non-pixel portion and the pixel portion of the active matrix substrate, i.e., contact with a boundary area. This sectional view contains, as a principal portion, elements along the cutting plane line, i.e., the one-dotted chain line in a plan view shown in FIG. 11.

This liquid crystal display device is constructed such that the active matrix substrate 90 is disposed in the face-to-face relationship with an opposite substrate 110, and the liquid crystal composition 40 is sealed in therebetween. Note that the active matrix substrate 90 is constructed in absolutely the same manner as in FIG. 8, and therefore the same elements are marked with the like reference numerals with an omission of the explanation thereof.

The opposite substrate 110 includes red, green and blue color filters 112R, 112G and 112B that are disposed corresponding to the pixel positions on a glass substrate 111. Further, these color filter materials are stacked, thus forming a pillar-shaped spacer 113. This pillar-shaped spacer 113 is not provided in the green color filter 112G. It is because green among the three primary colors is most recognizable in terms of nature of eyesight of a human being and is therefore most conspicuous if defective. Accordingly, in the case of providing the spacer lying across the pixel portion, only blue or only red or a combination of blue and red are preferably selected as pixel portion across where the spacer lays.

In the case where the spacer is disposed lying across the pixel portion, it is to be noted that by removing a part of pixel electrode with which the spacer contacts to prevent the spacer from a direct impingement upon the pixel electrode, the possibility of causing the short-circuit between the common electrode formed on the spacer and the pixel electrode can be reduced.

Furthermore, if an electrode formed on a spacer which contacts to the active matrix substrate is made in disconnection to the common electrode, by eliminating deposition of electrode on sides of the spacer, short-circuit can be prevented without removing a part of pixel electrode.

Still further, in the reverse stagger type structure, when patterning insulating film on the signal line and the insulating film is patterned so that the periphery of the pixel electrode and the insulating film are overlapped, short-circuit can be prevented if a spacer portion formed lying across the pixel electrode is disposed in an area where the pixel electrode and the insulating film are overlapped.

Furthermore, in the illustrative embodiment, the spacer is disposed on the pixel portion and the non-pixel portion adjacent thereto. If the spacer has a large diameter, however, it is not inconvenient that the spacer is laid across a part of the switching elements.

Moreover, if a portion where the spacer contacts is an end position of rubbing within the pixel portion, an insufficient aligning area by existence of a spacers does not extend to the adjacent pixel, and as a result the rubbing can be well done.

It is not necessarily limited as this embodiment where spacer position is laid across pixel portion and non-pixel portion. In any spacer disposing patterns for any switching element structures, it is effective to dispose a spacer so that defective rubbing (insufficient aligning) area by existence of spacer during rubbing treatment of aligning film is not included at least in green pixel or to dispose the spacer at the end portion of the rubbing treatment.

Figure 12:
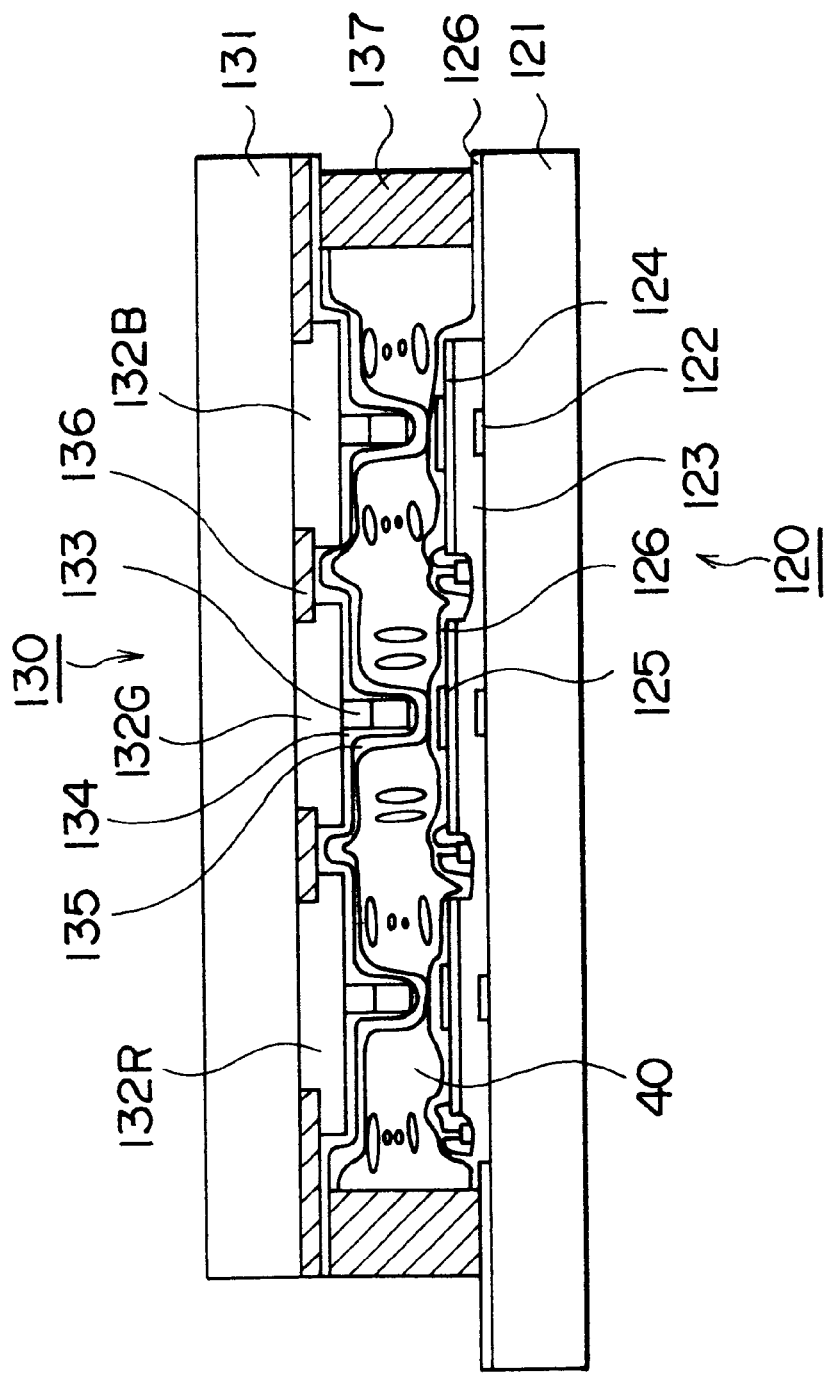
FIG. 12 is a sectional view of a sixth embodiment of the liquid crystal display device according to the present invention but schematically shows a construction of the embodiment in which the spacer contacts corresponding to an auxiliary capacitance line.

FIG. 12 is a sectional view illustrating the active matrix liquid crystal device in accordance with a sixth embodiment of the present invention. This sectional view contains, as a principal portion, elements along the cutting plane line, i.e., the one-dotted chain line in a plan view shown in FIG. 13.

This liquid crystal display device is constructed such that an active matrix substrate 120 of the reverse stagger type is disposed in a face-to-face relationship with an opposite substrate 130, and the liquid crystal composition 40 is sealed in therebetween. The active matrix substrate 120 is, as in the embodiments discussed above, provided with TFT as the switching element and the pixel portion as well. However, the TFT configuration is the same, and the explanation thereof is omitted. In the pixel portion, a storage capacitance line 122 serving as a lower layer wiring is formed on a glass substrate 121, and the whole pixel area including this storage capacitance line 122 is covered with an insulating film 123, and a pixel electrode 124 is formed thereon. Then, an insulating film 125 is formed on the pixel electrode in a position corresponding to the auxiliary capacitance line. Further, an aligning film 126 is formed on the whole.

In the case where the storage capacitance line is formed by opaque film, e.g. MoTa film, it causes no display problem even if the spacer is disposed on the storage capacitance line, since the area of the storage capacitance line becomes non display area.

An opposite substrate 130 includes red, green and blue color filters 132R, 132G and 132B formed corresponding to the pixel position on the glass substrate 131. Black matrices 136 defined as light shield film are provided between these color filters. Further, these color filter materials are stacked, thus forming a pillar-shaped spacer 133. This pillar-shaped spacer 133 is each provided in a position corresponding to the storage capacitance line 122 of the active matrix substrate 120.

The active matrix substrate 120 is disposed in the face-to-face relationship with an opposite substrate 130, and these substrates are fixed by a bonding agent 137. Then, the liquid crystal composition 40 is sealed in a space between the two substrates.

In accordance with this embodiment, the pillar-shaped spacer 133 is provided in the position corresponding to the storage capacitance line 122, and hence the reliability upon the device is not spoiled even if the pillar-shaped spacer strongly contacts the active matrix substrate 120. Moreover, the insulating film 125 is formed on the pixel electrode, and therefore, even if the aligning film 126 is ruptured, the insulating property can be maintained.

Figure 14:
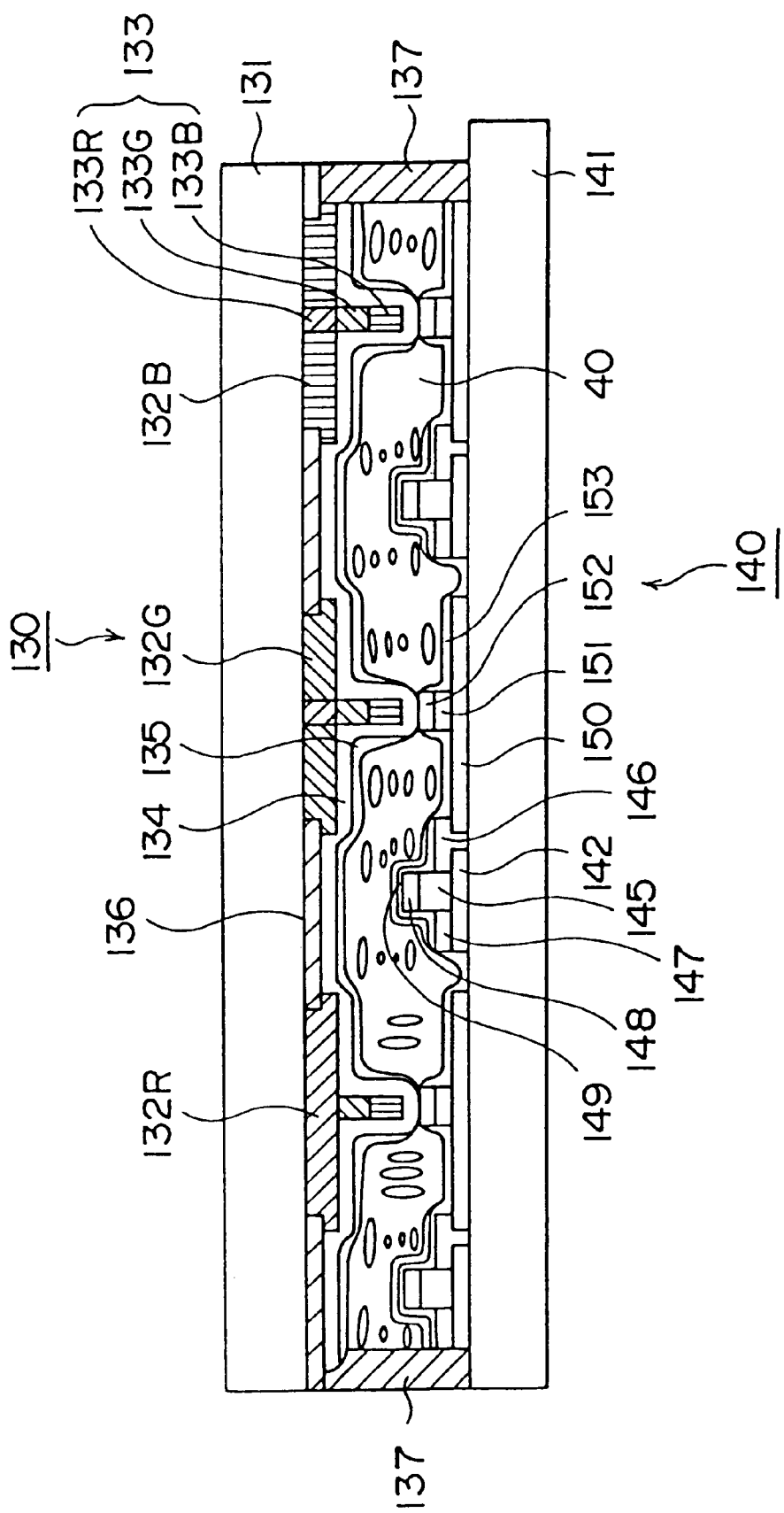
FIG. 14 is a sectional view of a seventh embodiment of the liquid crystal display device according to the present invention but schematically shows a construction of the embodiment in which the spacer contacts corresponding to the auxiliary capacitance line.

FIG. 14 is a sectional view illustrating the active matrix liquid crystal device in accordance with a seventh embodiment of the present invention.

This liquid crystal display device is constructed such that an active matrix substrate 140 is disposed in the face-to-face relationship with the opposite substrate 130, and the liquid crystal composition 40 is sealed in therebetween. The opposite substrate 130 is the same as in the case of FIG. 12, and its explanation is omitted.

The active matrix substrate 140, unlike the embodiments discussed above, has a positive stagger type of TFT serving as a switching element.

A semiconductor film 142 composed of amorphous silicon is formed on the TFT portion on the side of the TFT portion of the glass substrate 141. A source 146 and a drain 147 are formed in the face-to-face relationship, with this semiconductor film 142 interposed therebetween. A gate electrode 148 is formed on the semiconductor film 142 with an insulating film 145 interposed therebetween. An insulating film 149 is deposited over the entire surface of the above-described TFT portion. A pixel electrode 150 is so formed as to be coupled with the source 146. A storage capacitance line 152 manufactured in the same process as the gate electrode by use of same polysilicon as the gate electrode, is formed a the central portion thereof with an insulating film 151 interposed therebetween. Then, an aligning film 153 is formed over the whole surface of the pixel portion.

The active matrix substrate 140 is disposed in the face-to-face relationship with the opposite substrate 130, and these substrates are fixed by a bonding agent 137. Then, the liquid crystal composition 40 is sealed in between the two substrates.

In accordance with this embodiment, if the thin aligning films 135 and 153 are ruptured by a pressure, the pillar-shaped spacer 133 is made to direct contact with the storage capacitance line 122, but operation characteristics can not be deteriorated if the storage capacitance line 152 and the common electrode 134 are short circuited since the same potential is supplied to both.

Further, the insulating film 151 is formed on the pixel electrode, and hence, even if the aligning films 135, 153 of spacer are ruptured, short-circuit between the pixel electrode 159 and the common electrode 134 is prevented and thus the insulating property can be maintained.

The spacer can be positively used as a conductive member. For example, if the spacer is made by a conductive material, the spacer 133 is capable to function as an electrode transfer member (transfer) for applying a voltage to the common electrode 134 from the active matrix substrate through the storage capacitance line 152. This electrode transfer member can be normally composed of silver paste. If the spacer also serves as it, the silver paste is not required. Further, the electrode transfer member is formed nowhere but on a pixel peripheral portion, and a resistance is large. However, as in this embodiment, if the spacer functions as the electrode transfer member, a multiplicity of electrode transfer members can be formed within the pixel area. It is therefore feasible to decrease the resistance.

As in the respective embodiments discussed above, the space can be formed in the non-pixel area in this embodiment also. Therefore, it is possible to eliminate a display defect due to a light leakage peripheral to the spacer and an ununiform diffusion. It is also feasible to provide the inexpensive liquid crystal display device exhibiting a high display performance in terms of contrast and brightness.

Note that the storage capacitance line is formed on the pixel electrode with an insulating film interposed therebetween as shown in FIG. 12, however, after the pixel electrode where the spacer contacts has been removed, the insulating film may be formed therein, and the spacer may contact therewith.

Figure 15:
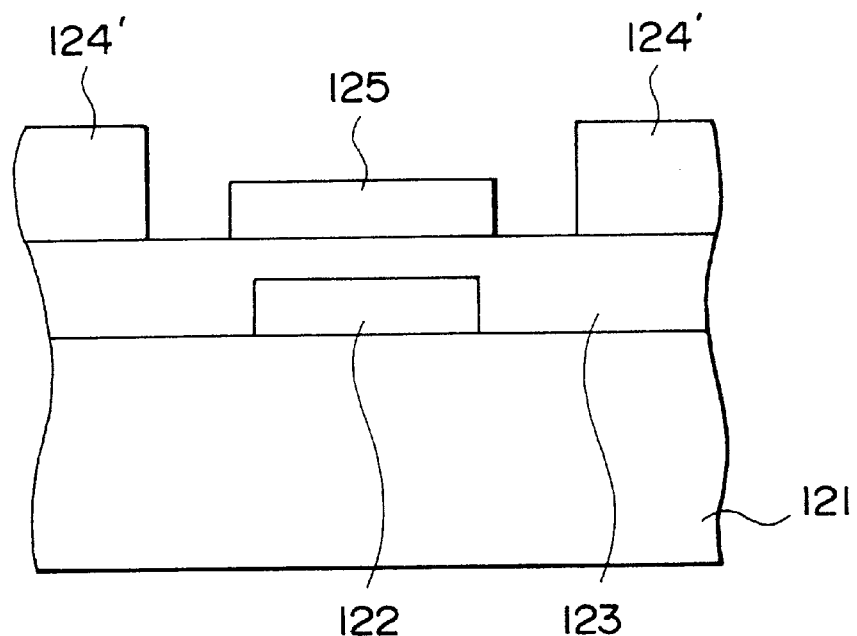
FIG. 15 is a partial enlarged sectional view illustrating a modified example of the auxiliary capacitance line portion shown in FIG. 14.
Figure 16:
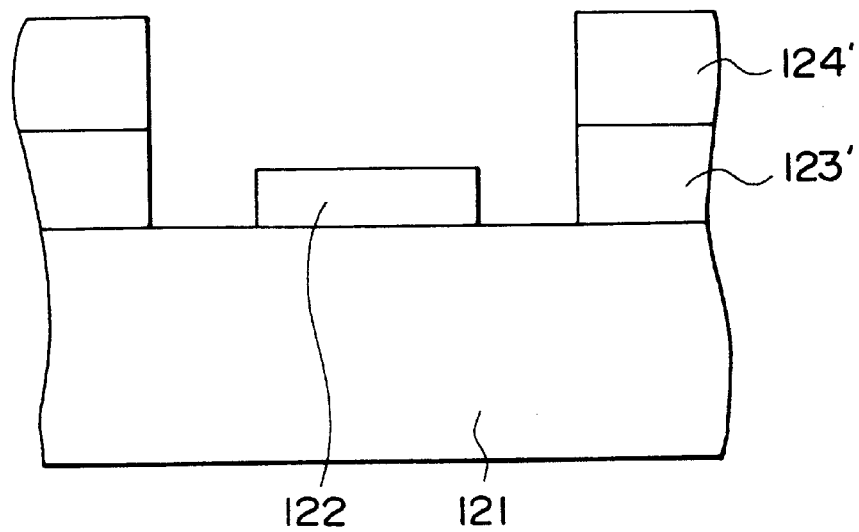
FIG. 16 is a partial enlarge sectional view showing a modified example of the auxiliary capacitance line portion shown in FIG. 15.

FIGS. 15 and 16 are partially enlarged sectional views of such examples, illustrating modifications of the storage capacitance line shown in FIG. 12.

Referring to FIG. 15, the pixel electrode 124 corresponding to the portion where the spacer contacts is removed. In this case, the short-circuit between the pixel electrode and the common electrode can be effectively prevented.

Removed, in FIG. 16, are the pixel electrode 124 that the spacer contacts and the insulating film 123 thereunder. In this case, it follows that the spacer contacts the storage capacitance line 122, thereby making it possible to effectively prevent the short-circuit with the common electrode. In this case, if no insulating film is formed on the spacer, the spacer can be used as the above-mentioned electrode transfer member.

Figure 17:
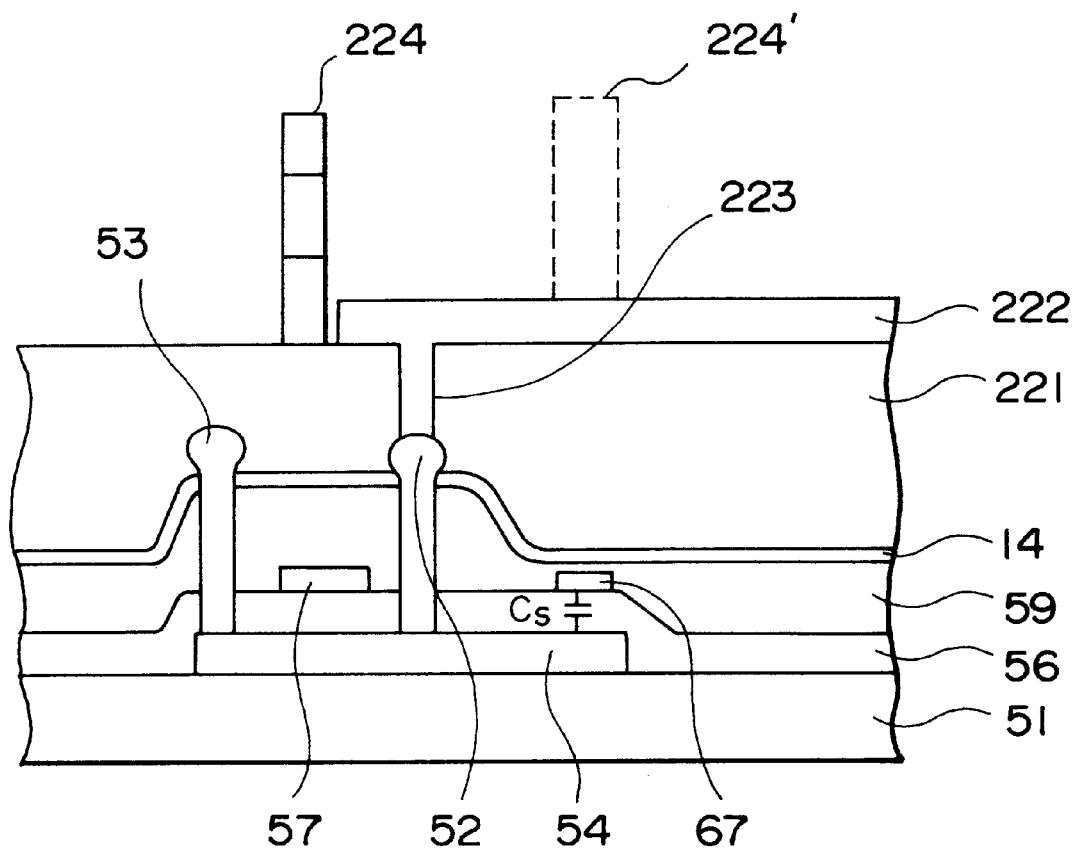
FIG. 17 is a sectional view of an additional embodiment of the liquid crystal display device according to the present invention but schematically shows a construction of the embodiment in which the spacer contacts an intermediate wiring layer.

FIG. 17 shows an eighth embodiment wherein the spacer is provided in a position corresponding to an intermediate wiring layer of the active matrix substrate. Referring to FIG. 17, the portions corresponding to those in FIG. 5 are marked with the like numerals.

The semiconductor layer 54 composed of polysilicon is formed on the TFT portion on the side of the main surface of the glass substrate 51, and the gate insulating film 56 is formed thereon. Formed on the gate insulating film 56 are the gate electrode 57 and the storage capacitance line 67 formed in the same process as that of the gate electrode 57. Formed thereon are the insulating film 59 composed of silicon oxide and the silicon nitride film 14 in positions corresponding to both sides of the gate electrode, the source electrode 52 and the drain electrode 53 penetrate the silicon nitride film 14, the insulating film 59 and the gate insulating film 56 and the extend to the semiconductor layer 54. The drain electrode is connected to the signal line (unillustrated). Both of the gate electrode 57 and the storage capacitance line 67 serve as intermediate layer wires.

In this embodiment, the semiconductor layer 54 is defined as a lower wiring layer and the signal line is defined as an upper wiring layer.

Further, an surface-flattened insulating film 221 is deposited over them, and a pixel electrode 222 is formed on the surface. This pixel electrode is coupled with the source electrode 52 via a material such as aluminum filling a contact hole 223.

Note that the storage capacitance line is electrically coupled with the pixel electrode, and a capacitance Cs is thereby formed between a layer formed during a formation process of the semiconductor layer and the semiconductor layer with the gate insulating film interposed therebetween.

A spacer 224 is, as apparent from FIG. 17, formed in a position on a gate electrode 57 as an intermediate layer wire and where no other wiring or electrode are not formed. However, when the spacer is disposed on the pixel electrode as in the case of a spacer 224', and when ITO (Indium Tin Oxide) films each defined as a face-to-face electrode is formed on a top portion and side surface, the electric short-circuit might happen, and therefore the spacer is not provided in such portions.

Further, the semiconductor layer in this embodiment involves the use of not amorphous silicon hitherto used but polysilicon. Therefore, a high mobility of electric charge is exhibited. In addition, the semiconductor layer can be formed simultaneously with a driver portion of the liquid crystal display device, and hence this contributes to a reduction in costs.

As described above, in a liquid crystal display device in which a spacer is disposed on an opposite substrate and common electrode is formed on the entire of the opposite substrate including the spacer, by disposing the spacer on an active matrix substrate with inorganic insulating film formed on the active matrix substrate interposed therebetween, short-circuit between a common electrode formed on the spacer and conductive material such as wirings or electrode formed on the active matrix substrate. Also the yield and display performance will be improved. Furthermore, same advantageous effect can be obtained for not only pillar-shaped spacer made of stacked color layers but also pillar-shaped spacer made of single layer resin. If spacers are formed on a substrate on which colored layers are formed, since spacers and colored layers can be formed by the same process, dispersion process for plastic beads can be eliminated.

Figure 18:
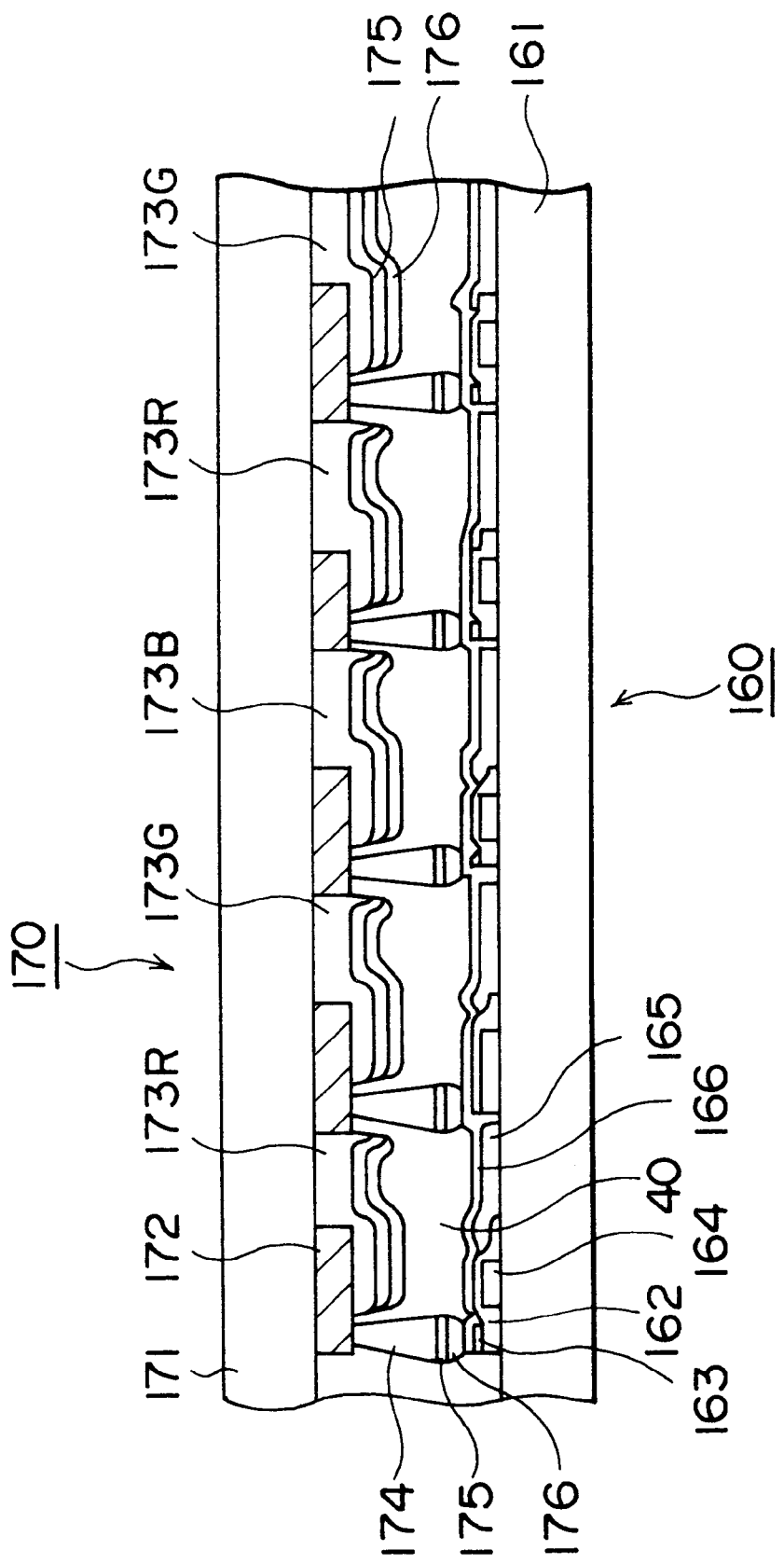
FIG. 18 is a sectional view of a still additional embodiment of the liquid crystal display device according to the present invention but schematically shows a construction of the embodiment in which the spacer contacts the intermediate wiring layer.
Figure 19:
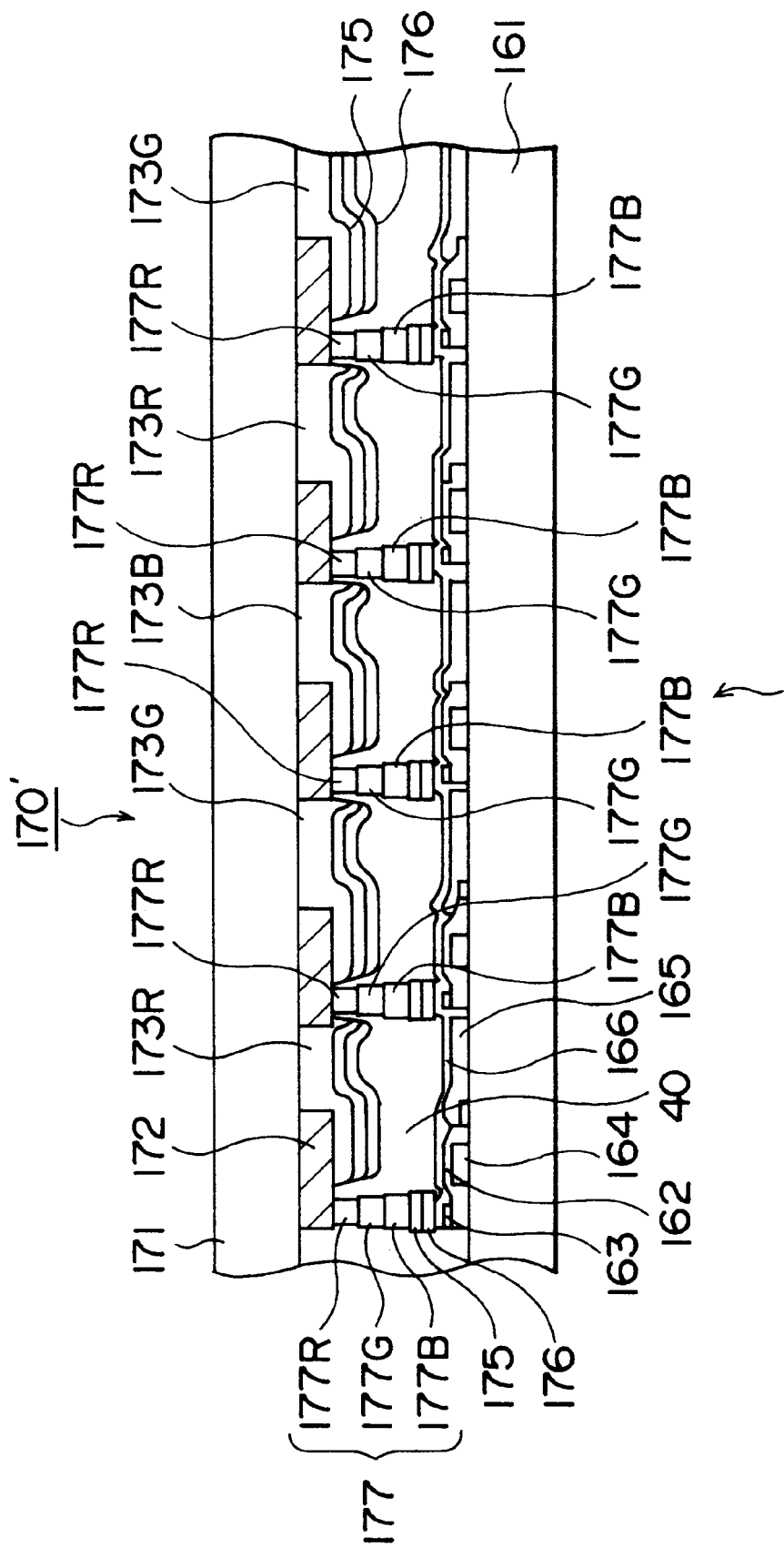
FIG. 19 is a sectional view showing an embodiment in which the spacer is disposed corresponding to the intermediate wiring layer.
Figure 20:
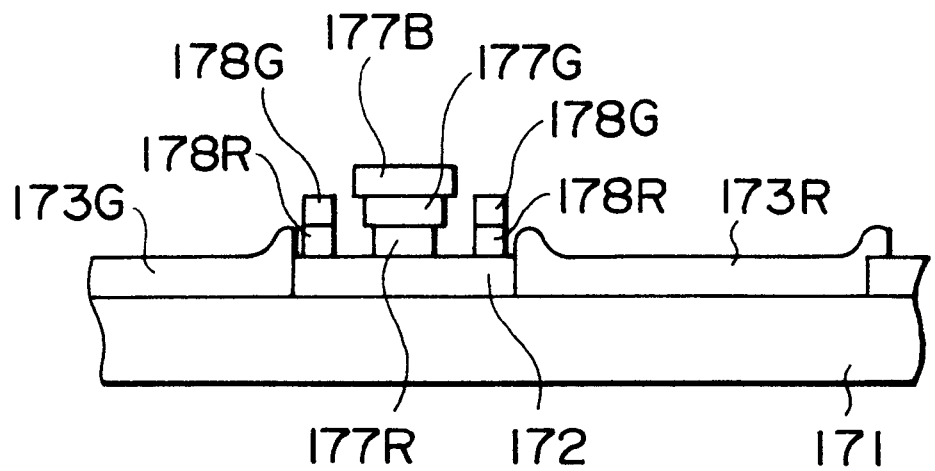
FIG. 20 is a partial sectional view showing a modification of the embodiment shown in FIG. 18.

FIGS. 18 through 20 are sectional views each illustrating the device in accordance with a ninth embodiment of the present invention.

The ninth embodiment has the same arrangement in terms of such a point as to form the pillar-shaped spacer as in the case of the first embodiment illustrated in FIGS. 1 to 3, but provides a construction irrespective of the contact position of the pillar-shaped spacer.

That is, referring to FIG. 18, a gate line 164 is formed in an area corresponding to one pixel on the surface of an active matrix substrate 161 disposed downward, and a thin-film transistor composed of amorphous silicon is formed thereon with the gate insulation film 162 therebetween. Signal lines 163 and a pixel electrode 165 composed of ITO are respectively formed rightward and leftward, and an aligning film 166 is formed thereon. These elements are repeatedly formed on the pixel-basis.

On an opposite substrate 170 disposed upward, a light shield layer 172 and a colored layer 173 are formed on the surface of the glass substrate 171 in areas each corresponding to one pixel. The colored layer is formed per pixel repeatedly in a sequence such as a red color 173R, a green color 173G and a blue color 173B. A spacer 174 consisting of an inversely-tapered cylindrical resist is formed on a part of the light shield layer, and a common electrode 175 and an aligning film 176 are formed on a from edge thereof and on each colored layer. Thus, since the spacer takes an inversely-tapered shape, and, therefore, when forming the common electrode by sputtering, no film is formed on the side surface of the spacer because of an overhang, and consequently the spacer itself does not become a conductive body. Accordingly, such a spacer has the insulating property, and hence the contact portion thereof is not specified. It is therefore feasible to prevent an occurrence of an unnecessary electric capacitance and the electric short-circuit as well. Further, the spacer can contact an arbitrary layer, and consequently a degree of freedom of design increases.

Given next is an explanation of a method of manufacturing the liquid crystal display device.

To start with, the active matrix substrate is manufactured. Normally, in the same way as the process of forming TFT, the film formation and patterning are repeated on the #$_{7059}$™ glass substrate 161 having a thickness of 1.1 mm and made by CORNING Corp., thereby forming an array substrate formed with the thin-film transistor composed of amorphous silicon, the signal line 163, the gate line 164 and the pixel electrode 165 composed of ITO. Thereafter, AL-1051™ (made by JAPAN SYTHETIC RUBBER CO., LTD.) serving as an aligning film material is coated to have a thickness on the order of 500 Å over the whole surface, and the rubbing process is executed, thereby forming the aligning film 166.

Next, the opposite substrate is prepared. This method, under the same condition as that in the first embodiment, involves coating photosensitive black resin CK-2000 (made by FUJI-HUNT ELECTRONICS TECHNOLOGY CO., LTD.) over the #7059 substrate 171 made by CORNING CORP., and, after being exposed, developing and thermal hardening, thus forming the light shield layer 172 having a film thickness of 2.0 μm. Subsequently, the red-colored layer 173R is formed by using ultraviolet ray hardening acrylic resin resist CR-2000™ (made by FUJI-HUNT ELECTRONICS TECHNOLOGY CO., LTD.) with a dispersion of a red pigment. Similarly, the green- and blue-colored layers 173G and 173B are repeatedly formed, and respectively thermally hardened at 230° C. for an hour. Herein, the green coloring material involves the use of CG-2000™ (made by FUJI-HUNT ELECTRONICS TECHNOLOGY CO., LTD.), and the blue-coloring material involves the use of CB-2000™ (made by FUJI-HUNT ELECTRONICS TECHNOLOGY CO., LTD.). Each of the layers has a thickness on the order of 1.5 μm.

Next, the ultraviolet ray hardening acrylic resin resist containing no pigment is coated over the whole surface by use of the spinner. A predetermined area for forming the spacer on the light shield layer is irradiated on the order of 100 mJ/cm² at a wavelength of 365 nm by use of such a photo mask as to irradiate it with light beams. Effected subsequently is a development in KOH 1% aqueous solution for 30 sec, thus forming the spacer 174 having a film thickness of 4 μm. At that time, an intensive development must be conducted. A diameter of the front edge enough to harden upon the irradiation of the light beams is kept as predetermined. In a root portion where the hardening is not necessarily sufficient, however, excessive etching is carried out, resulting in an inversely-tapered shape. Thereafter, the ITO film as the common electrode 175 is formed to have a thickness on the order of 1500 Å by the sputtering method, and the same aligning film material is formed thereon. Thereafter, the rubbing process is executed, thus forming the aligning film 176. The spacer 174 assumes e inversely-tapered shape, and its upper portion takes an overhanging shape. Hence, when sputtering is effected, neither the ITO film nor the aligning film is deposited on the side surface of the spacer. Note that an adhesive strength of the spacer can be obtained by forming the spacer before forming the transparent electrode.

Thereafter, a bonding agent is printed, excluding a filling port (unillustrated), along the periphery of the aligning film 176 of the substrate 171, and an electrode transfer material for applying a voltage to the face-to-face electrode from the active matrix substrate is formed on an electrode transfer electrode in the vicinity of the bonding agent.

Next, the aligning films 176 and 166 are disposed in the face-to-face relationship, and further the substrates 160 and 170 are so disposed that rubbing directions thereof are set at 90 degrees, respectively. Then, the bonding agent is hardened by heating, thus adhering these substrates to each other. Next, the liquid crystal composition 40 obtained by adding S811 of 0.1 wt % to ZLI-1565 (made by E. MERCK CO., LTD.) is filled via the filling port by the ordinary method, and thereafter the filling port is sealed by the ultraviolet ray hardening resin.

The thus formed color display type active matrix liquid crystal display device is of such a type of using no plastic beads, and the spacer can contact the arbitrary layer. It is therefore feasible to obtain the high-display-performance and trustworthy liquid crystal display device capable of preventing the light leakage from the spacer and preventing also, as a matter of course, the short-circuit, and occurrences of delay and of rounding of the applied voltage due to a parasitic capacitance produced between the wire and the spacer.

Note that the adjustment is made by the development because of obtaining the overhanging configuration in this embodiment, but this can be attained also by hardening only the surface while making the irradiation light beams feeble during the exposure.

FIG. 19 shows a modification of the embodiment illustrated in FIG. 18, wherein the same elements as those in FIG. 18 are marked with the like reference numerals, and the detailed explanation thereof is omitted.

According to this embodiment, the active matrix substrate 160 is constructed in absolutely the same manner, but only one difference is the construction of a spacer 77. The spacer consists of three colored layers 177R, 177G and 177B. These three colored layers 177R, 177G, 177B are so formed that the layers toward its tip have larger diameters to assume substantially the inversely-tapered shape on the whole.

Next, the method of manufacturing this liquid crystal display device will be described.

The methods of manufacturing and assembling the active matrix substrate 160 are absolutely the same as those shown in FIG. 18 and therefore omitted in explanation. Given is an explanation of how the opposite substrate 170' is manufactured.

A light shield layer 172 having a film thickness of 2.0 μm is formed on the glass substrate 171 by use of photosensitive black resin CK-2000™ (made by FUJI-HUNT ELECTRONICS TECHNOLOGY CO., LTD.). Formed subsequently repeatedly by the same method are red-colored layers 173R, 177R, green-colored layers 173G, 177G and blue-colored layers 173B, 177B. Herein, the red coloring material involves the use of CR-2000™ (made by FUJI-HUNT ELECTRONICS TECHNOLOGY CO., LTD.), the green coloring material involves the use of CG-2000™ (made by FUJI-HUNT ELECTRONICS TECHNOLOGY CO.), and the blue-coloring material involves the use of CB-2000™ (made by FUJI-HUNT ELECTRONICS TECHNOLOGY CO., LTD.). Each of the layers has a thickness on the order of 1.5 μm. In the spacer 77, the three-colored layers are stacked, however, the upper the layers go up, the larger diameters becomes, such as R; 10 μm, G; 13 μm, B; 16 μm. Thus, the spacer can be formed simultaneously when forming the color filters.

Thereafter, the ITO film as a common electrode 175 is formed to have a thickness on the order of 1500 Å by the sputtering method, and the aligning film material is formed thereon. After this processing, the rubbing process is executed, thereby forming an aligning film 176. In the spacer portion, since the upper the layers go up the larger diameters become, the space has an overhanging shape. Therefore, when the ITO film and the aligning film are deposited by sputtering, it is the same as that in FIG. 18 the insulating property of the spacer can be kept without being adhered to the side surface.

In the liquid crystal display device formed by use of the above-described opposite substrate, the spacer is allowed to contact the arbitrary layer. It is therefore feasible to obtain the high-display-performance and trustworthy liquid crystal display device capable of preventing, as a matter of course, the short-circuit, and occurrences of delay and of rounding of the applied voltage due to a parasitic capacitance produced between the wire and the spacer.

As described above, in order to disconnect an electrode formed on a spacer which contacts to an active matrix substrate from an common electrode, a structure of the spacer in which diameter increasing portion from a surface of substrate to upper layer is employed. In such structure, the electrode is hardly deposited at the diameter increasing portion, resulting in obtaining disconnection status between electrode portion on the spacer and the common electrode.

FIG. 20 is a partial sectional view showing a modification of the embodiment shown in FIG. 19. In accordance with this embodiment, two-layered cylindrical wall bodies 178R, 178G are formed concentrically with the spacer 177 when forming the spacer. Based on such a construction, the cylindrical wall members are stacked for two color layers and therefore has a height smaller than the spacer. These concentric cylindrical wall bodies hinder putter particles from entering from oblique directions and thereby prevent films from being formed on the side walls of the spacer. Besides, the concentric cylindrical wall bodies also prevent the spacer from coming off when rubbing process is carried out and are therefore effective in enhancing the reliability.

Figure 21:
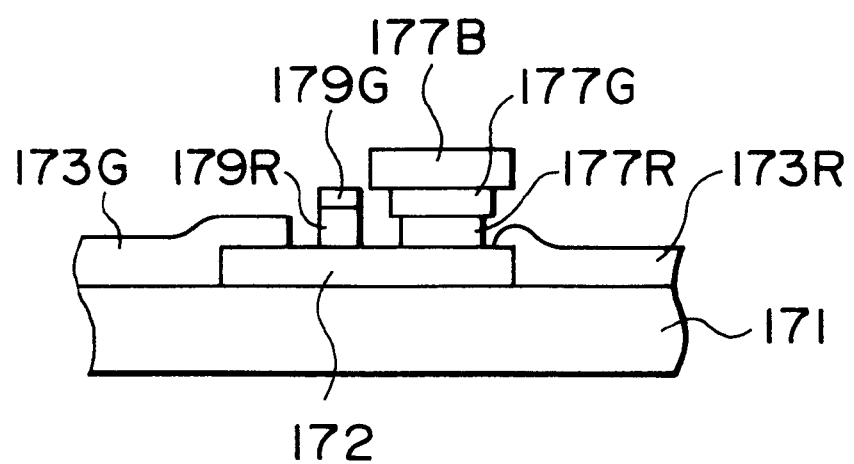
FIG. 21 is a partial sectional view showing a modification of the embodiment shown in FIG. 18.

FIG. 21 is a partial sectional view showing an another modification of the embodiment illustrated in FIG. 19. In this modified embodiment, two-layered pillar-shaped barrier layers 179R, 179G each having a diameter of 10 μm are formed in entrance-side positions of the aligning film with respect to the pillar-shaped spacer 177. According to this embodiment, on the occasion of an orientation process, the pillar-shaped spacer can be prevented from coming off by an eternal force of the rubbing, and the reliability can be thereby increased. This embodiment, even if there is no space enough to form the concentric cylindrical wall body as shown in FIG. 21, can be carried out.

The embodiment illustrated in FIG. 21 can be further modified in a variety of forms. for example, the pillar-shaped spacer having the overhang is allowed to contact in the position corresponding to the wiring layer of the lower layer as shown in FIG. 1.

Figure 22:
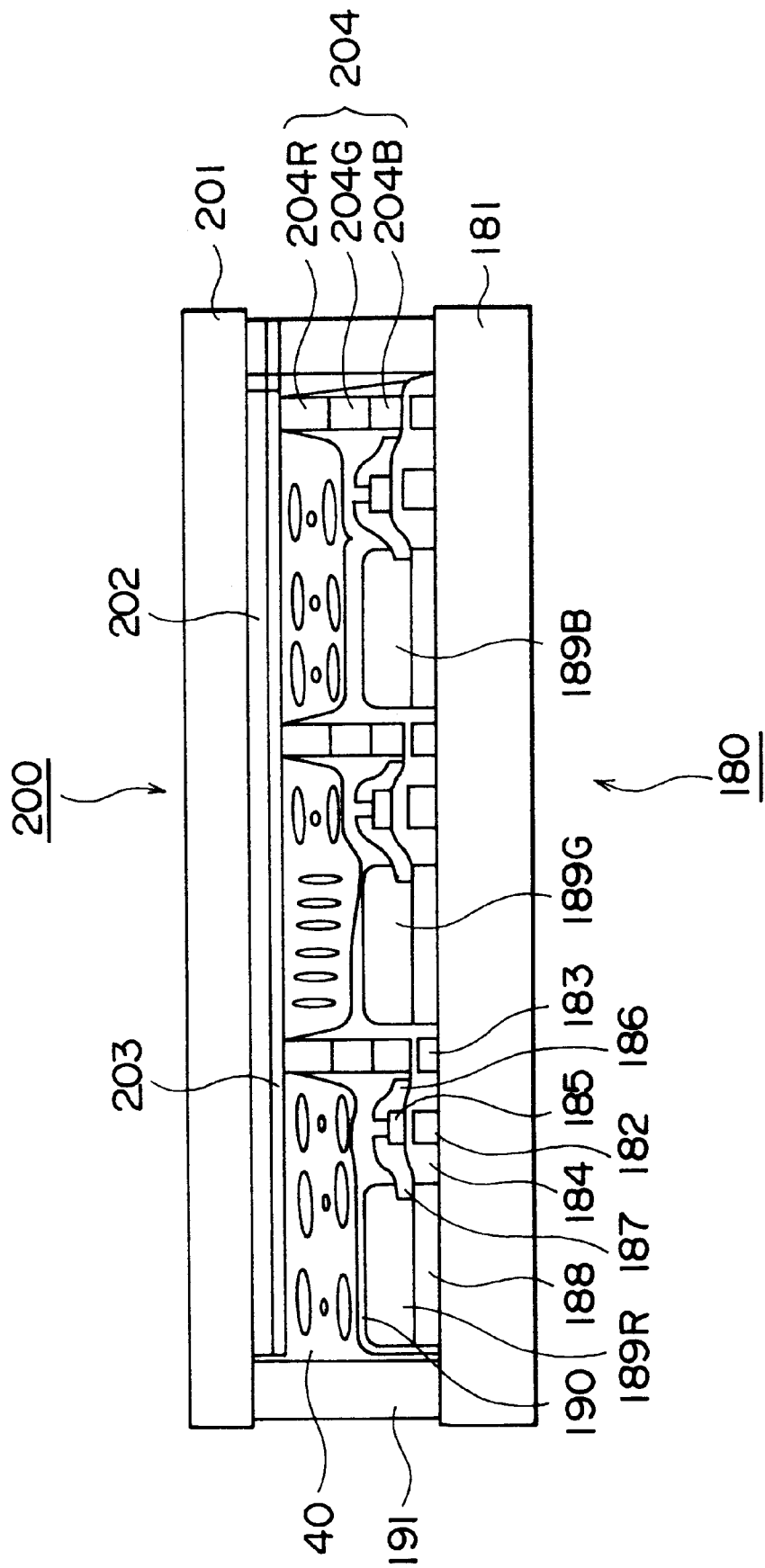
FIG. 22 is a sectional view of a yet additional embodiment of the liquid crystal display device according to the present invention but schematically shows a construction, wherein the invention is applied to a so-called color filter on-array type with color filters provided on the active matrix substrate.

FIG. 22 is a sectional view illustrating a tenth embodiment of the present invention, wherein the invention is applied to the liquid crystal display device including the active matrix substrate formed with the color filters.

This active matrix substrate 180 includes a gate electrode 182, a gate line 183 and a pixel electrode 188 that are respectively disposed on the main surface of a glass substrate 181, and an insulating film 184 is deposited on the gate line 183 as well as on the gate electrode 182. A semiconductor film 185 composed of amorphous silicon is formed upwardly of a gate electrode 182 above that insulating film 184. A source 187 and a drain 186 are formed astride the semiconductor film 185 and the insulating film 184 in such a manner that the source 186 and the drain 187 are disposed in the face-to-face relationship and spaced at a predetermined distance at a central portion of the semiconductor film 185. A signal line (not shown) is so formed as to be connected to the drain 86, and the source 187 is connected to the pixel electrode 188. A red-colored layer 189R, a green-colored layer 189G and a blue-colored layer 189B each serving as a color filter are sequentially formed per pixel on the pixel electrode 188. An aligning film 190 is formed over the entire surface thereof.

On an opposite substrate 200 disposed upward, a common electrode 202 and an aligning film 203 are deposited on the whole surface of the glass substrate 201. Further, a red-colored layer 204R, a green-colored layer 204G and a blue-colored layer 204B are aminated corresponding to the gate line 183 of the active matrix substrate 180, thus forming a pillar-shaped spacer 204.

Then, these two substrates are disposed in the face-to-face relationship, and the spacer 204 of the opposite substrate 200 is made to contact onto the gate line defined as the lower layer of the active matrix substrate 180.

According to the construction in which the ordinary color filters are formed on the pixel electrode, there arises a problem in terms of a drop of voltage due to the colored-layers. However, the colored layers are made conductive, thereby making it possible to obviate the problem of causing the drop of voltage. In the case of forming the spacer by stacking such conductive colored layers, however, if this spacer is formed on the lower layer, as in the case of FIG. 1, the two-layered insulating layers exist on the gate line defined as the lower layer, and there must be very little possibility in which the defect such as the short-circuit because of a spoiled insulating property even when the spacer 204 is brought into contact therewith. Then, the two substrates are bonded to each other by a bonding agent 191, and the liquid crystal composition 40 fills and is sealed in between the two substrates.

Note that an attainment of such a construction involves executing the array formation in substantially the same manner as that described in FIG. 1 and thereafter selectively forming the colored layers on the pixel electrode.

Further, if the conductive colored layer well functions as an electrode, there is no necessity for separately forming the pixel electrode.

Figure 23:
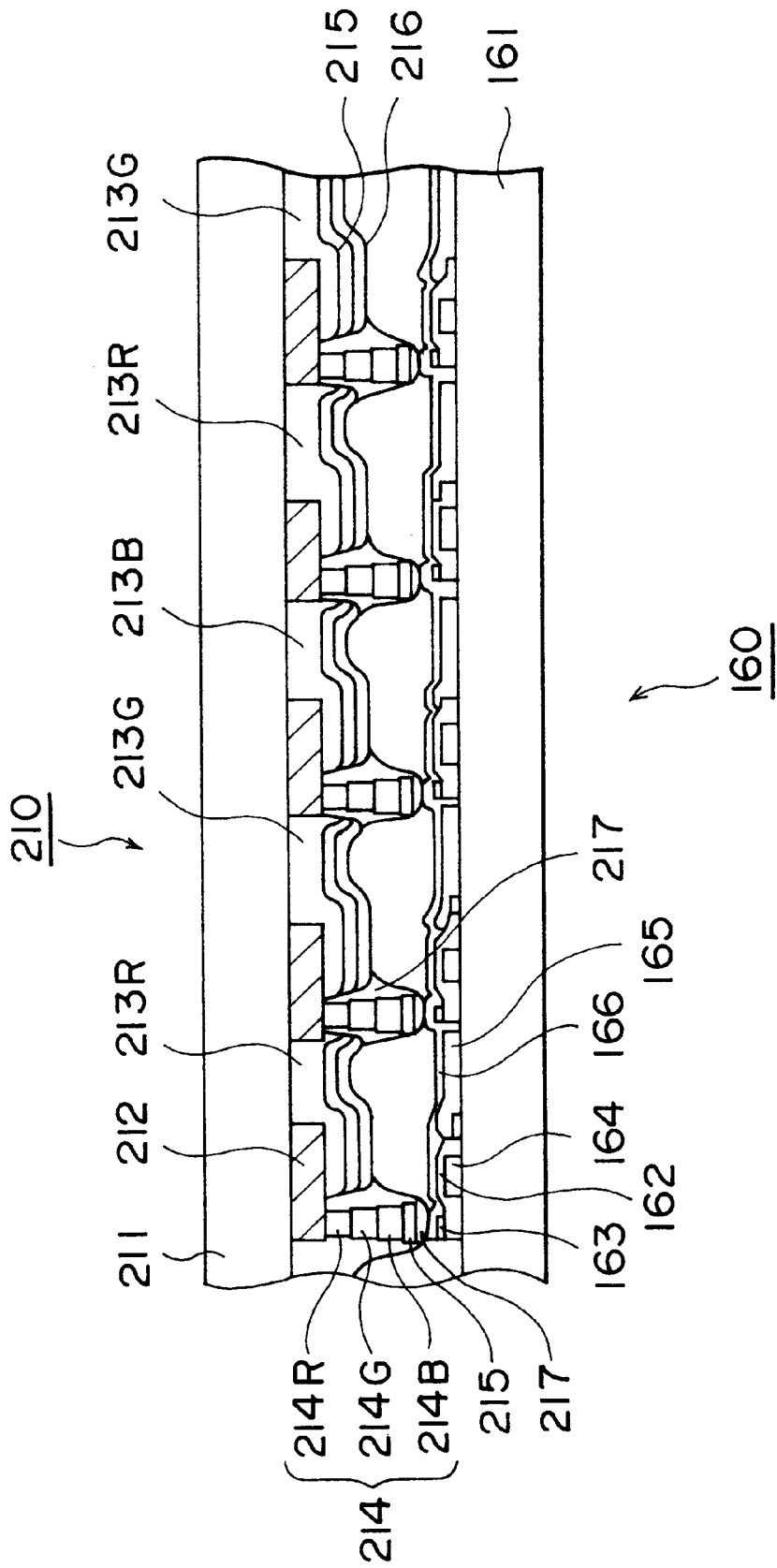
FIG. 23 is a sectional view of other embodiment of the liquid crystal display device according to the present invention but schematically shows a construction, wherein the spacer is constructed as an insolation type.

FIG. 23 is a sectional view showing a eleventh embodiment of the present invention, wherein the construction is that the active matrix substrate 160 is disposed in the face-to-face relationship with the opposite substrate 210, and the liquid crystal composition 40 is sealed in between the two substrates. The active matrix substrate 160 is absolutely the same as that in FIG. 18, and the explanation thereof is omitted.

On the opposite substrate 210, a light shield layer 212 is formed on the surface of the glass substrate 211, and also the colored layers are repeatedly formed thereon in a sequence such as a red-colored layer 213R, a green-colored layer 213G and a blue-colored layer 213B. Formed in a part of the light shield layer 212 is a pillar-shaped spacer 214 constructed by stacking layers 214R, 214G, 214B corresponding to the red-colored layer 213R, the green-colored layer 213G and the blue-colored layer 213. A common electrode 215 and an aligning film 216 are formed on the respective colored layers as well as at the tip of the spacer 214. Further, an insulating film 217 is formed at the tip portion of the pillar-shaped spacer.

FIGS. 24 and 25 are schematic sectional views drawn with attention paid on the configuration of the tip portion of the spacer. FIG. 24 shows a case where a common electrode (ITO film) 215 is formed on only the tip surface of the spacer 214, while the entire surface of the spacer is covered with the insulating film 217. FIG. 26 shows a case where the whole spacer 214 is covered with the insulating film 217, and only the tip portion thereof is formed with the common electrode (ITO film) 215. With this formation, it is possible to restrain an adverse influence upon the device because of impurity contents eluting out of the spacer member and further short-circuit between the common electrode and the conductive film formed on the active matrix substrate.

The present invention can be further modified in a variety of forms exclusive of the embodiments discussed above.

For instance, if the spacer including the stepwise-formed colored layers as illustrated in FIG. 8 is made to contact to the wiring layer of the lower layer as shown in FIG. 1, the insulating property in the spacer portion can be further enhanced.

Further, there is shown the sequence of forming the colored layers by way of one example in each of the embodiments, and the present invention is not confined to this sequence of formation.

Moreover, the stacked-layer spacer is constructed by stacking the three-colored layers in each of the embodiments but ma be constructed by stacking two-colored layers with a proper selection of a thickness of each colored layer. Further, there may be included such stacked-layer spacers that a diameter thereof continuously decreases from its distal end to its proximal end in the stacked state, or a specified layer has a diameter gradually decreasing downward from above and the thus reduced diameter is maintained at the lower layer.

As discussed above, according to the present invention, the spacer is formed by stacking the colored layers of the color filters and disposed in such a position as to exhibit the high dielectric breakdown strength of the active matrix substrate, and hence the insulating property of the spacer portion is enhanced without using any plastic beads, thereby making it feasible to improve the yield and the display performance and to reduce the costs.

It is apparent that, in this invention, a wide range of different working modes can be formed based on the invention without deviating from the spirit and scope of the invention. This invention is not restricted by its specific working modes except being limited by the appended claims.

What is claimed is:

1. A liquid crystal display device comprising:

an active matrix substrate including a plurality of gate lines on a main surface thereof and a plurality of signal lines that are so arrayed as to intersect over the gate lines, switching elements of reverse stagger type disposed at intersections of said gate lines and said signal lines and coupled with a corresponding one of said gate lines and a corresponding one of said signal lines, and a, plurality of pixel electrodes coupled with said switching elements;

an opposite substrate including a plurality of spacers of a pillar-shaped protrusion on a main surface thereof and a common electrode disposed on an entire substrate surface including said spacers;

said active matrix substrate and said opposite substrate being opposed and liquid crystal material being sealed in a space between said active matrix substrate and said opposite substrate;

wherein said spacers are disposed over said gate lines where a high dielectric strength is exhibited between said common electrode and said active matrix substrate.

2. A liquid crystal display device according to claim 1, further comprising a plurality of colored layers disposed on said opposite substrate, said spacers being constructed by stacking said plurality of colored layers, and said common electrode being disposed on said opposite substrate including said colored layers and said spacers.

3. A liquid crystal display device according to claim 1, wherein a total area size of contact portions of said spacers with said active matrix substrate is over 1/20 but under twice a total area size of said switching elements.

4. A liquid crystal display device according to claim 1, wherein the number of said spacers have a linear relationship with respect to the number of said switching elements.

5. A liquid crystal display device comprising: an active matrix substrate including a plurality of gate lines on a main surface thereof and a plurality of signal lines that are so arrayed as to intersect over the gate lines, switching elements of reverse stagger type disposed at intersections of said gate [line] lines and said signal lines and coupled with a corresponding one of said gate lines and a corresponding one of said signal lines, and a plurality of pixel electrodes coupled with said switching elements and a plurality of storage capacitance lines;

an opposite substrate including a plurality of spacers of a pillar-shaped protrusion on a main surface thereof and a common electrode disposed on an entire substrate surface including said spacers;

said active matrix substrate and said opposite substrate being opposed and liquid crystal material being sealed in a space between said active matrix substrate and said opposite substrate;

wherein said spacers are disposed over said storage capacitance lines and in positions where said pixel electrodes are formed with an insulating film interposed therebetween; and pixel electrode portions, corresponding to the positions where said spacers are disposed, are removed.

6. A liquid crystal display device comprising:

an active matrix substrate including a plurality of gate lines and a plurality of signal lines that are so arrayed as to intersect each other on a main surface, a switching element disposed at an intersection of each of said gate lines and each of said signal and coupled with each of said gate lines and each of said signal lines, a plurality of pixel electrodes each coupled with said switching element, and a plurality of storage capacitance lines, an opposite substrate including a plurality of spacers of a pillar-shaped protrusion on a main surface and a common electrode disposed on an entire substrate surface, said active matrix substrate and said opposite substrate being opposed and liquid crystal material being sealed in a space between said active matrix substrate and said opposite substrate, wherein said spacers are disposed in positions where a high dielectric strength is exhibited between said common electrode and said active matrix substrate, said spacers are disposed over said storage capacitance lines, and said common electrode on said spacers is electrically coupled with said storage capacitance lines.

7. A liquid crystal display device comprising:

an active matrix substrate including a plurality of gate lines and a plurality of signal lines that are so arrayed as to intersect each other on a main surface, switching elements disposed at intersections of said gate lines and said signal lines and coupled with a corresponding one of said gate lines and a corresponding one of said signal lines, a plurality of pixel electrodes coupled with said switching elements, and a plurality of storage capacitance lines;

an opposite substrate including a plurality of spacers of a pillar-shaped protrusion on a main surface and a common electrode disposed on an entire substrate surface containing said spacers;

said active matrix substrate and said opposite substrate being opposed and liquid crystal material being sealed in a space between said active matrix substrate and said opposite substrate, wherein said spacers are disposed in positions where that a high dielectric strength is exhibited between said common electrode and said active matrix substrate, and each of said spacers assumes such an inversely tapered shape that a diameter thereof reduces simply from its distal end to its proximal end.

8. A liquid crystal display device according to claim 7, further comprising:

cylindrical wall members disposed lower than a height of said spacers along an outer periphery of said spacers and concentrically with said spacers.

9. A liquid crystal display comprising:

an active matrix substrate including a plurality of gate lines on a main surface thereof and a plurality of signal lines that are so arrayed as to intersect over the gate lines, switching elements of reverse stagger type disposed at every intersection of said gate line and said signal line and coupled with said gate line and said signal line, and a plurality of pixel electrodes coupled with said switching elements;

an opposite substrate including a plurality of spacers of a pillar-shaped protrusion on a main surface thereof and a common electrode disposed on an entire substrate surface including said spacers; and an aligning film disposed on each of said active matrix substrate and said opposite substrate, a pillar-shaped barrier lower than the height of said spacer disposed in an entrance-side position in an aligning processing direction of said aligning film with respect to said pillar-shaped spacer;

said active matrix substrate and said opposite substrate being opposed and liquid crystal material being sealed in a space between said active matrix substrate and said opposite substrate.

10. A liquid crystal display device comprising:

an active matrix substrate including a plurality of semiconductor layers disposed on a main surface, a plurality of gate lines and a plurality of storage capacitance lines disposed over said semiconductor layers with a first insulating film interposed therebetween, a second insulating film disposed thereon, a plurality of pixel electrodes disposed over said second insulating film with a third insulating film interposed therebetween, a plurality of signal lines disposed on said second insulating film, and drain electrodes which are connected via first through-holes formed in said first and second insulating films to said semiconductor layers and said pixel electrodes disposed on said third insulating film and connected to source electrodes through second through-holes disposed in said third insulating film, said drain electrodes being connected to said signal lines;

an opposite substrate including a common electrode formed on a main surface;

liquid crystal material sealed in between said active matrix substrate and said opposite substrate main surfaces of which are disposed in a face-to-face relationship; and a plurality of spacers of a pillar-shaped protrusion for maintaining a distance between said active matrix substrate and said opposite substrate.

11. A liquid crystal display device according to claim 10, wherein said spacers are disposed on said gate lines or on said storage capacitance lines.

12. A liquid crystal display device according to claim 10, wherein said spacers are formed in the same step as a step of forming said third insulating film.

13. A liquid crystal display device according to claim 12, wherein said third insulating film is composed of a color layer, and said spacers are constructed by stacking a plurality of colored layers.

14. A liquid crystal display device according to claim 10, further comprising a plurality of colored layers disposed on said opposite substrate, wherein said spacers are constructed by stacking said plurality of colored layers, and said common electrode is disposed on said substrate including said colored layers and said spacers.

15. A liquid crystal display device according to claim 10, wherein said spacers are disposed on positions through said second and third insulating films, and pixel electrode portions, corresponding to the positions where said spacers are disposed, are removed.

16. A liquid crystal display device according to claim 10, wherein said spacers are disposed on said opposite substrate, said common electrode is disposed on said opposite substrate including said spacers, said spacers are disposed on said storage capacitance lines, and said common electrode on said spacers is electrically connected to said storage capacitance lines.

17. A liquid crystal display device according to claim 10, wherein a total area size of contact portions of said spacers with said active matrix substrate is over 1/20 but under twice a total area size of said switching elements.

18. A liquid crystal display device according to claim 10, wherein the number of said spacers have a linear relationship with respect to the number of said switching elements.

19. A liquid crystal display device according to claim 10, wherein each of said spacers assumes such an inversely tapered shape that a diameter thereof reduces simply from its distal end to its proximal end.

20. A liquid crystal display device according to claim 19, further comprising:

a cylindrical wall member disposed lower than a height of said spacer along an outer periphery of said spacer and concentrically with said spacer.

21. A liquid crystal display device according to claim 10, further comprising an aligning film disposed on each of said active matrix substrate and said opposite substrate, a pillar-shaped barrier lower than the height of said spacer disposed in an entrance-side position in an aligning processing direction of said aligning film with respect to said pillar-shaped spacer.

22. A liquid crystal display device according to claim 10, wherein said semiconductor layers are made of polysilicon.

23. A liquid crystal display device according to claim 22, further comprising a driver portion of said liquid crystal display device, wherein said semiconductor layers are formed simultaneously with said driver portion.

24. A liquid crystal display device according to claim 10, wherein said spacers are made of resin.

25. A liquid crystal display device according to claim 10, wherein said third insulating layer is surface flattened insulating film.

26. A liquid crystal display device according to claim 10, wherein said signal lines are mainly composed of aluminum.

27. A liquid crystal display device according to claim 10, wherein said second insulating layer comprises silicon oxide.

28. A liquid crystal display device comprising:

an active matrix substrate including:

a plurality of gate lines and a plurality of signal lines that are so arrayed as to intersect each other on a main surface, a plurality of switching elements disposed at intersections of said gate lines and said signal lines and coupled with a corresponding one of said gate lines and a corresponding one of said signal lines, a plurality of pixel electrodes coupled with said switching elements, and a plurality of storage capacitance lines; and an opposite substrate including:
  a common electrode on a main surface; and
  a plurality of spacers of pillar-shaped protrusions provided between said active matrix substrate and said opposite substrate,
    wherein said spacers are disposed in a non-pixel area and in such positions where conductive substance is not disposed,
    liquid crystal material is sealed in a space between said active matrix substrate and said opposite electrode substrate, and
    said spacers are disposed on the side of said opposite substrate and are covered with said common electrode.

29. A liquid crystal display device according to claim 28, wherein said colored layers and said spacers are disposed on said opposite substrate, and
  said spacers are constructed by stacking said plurality of colored layers.

30. A liquid crystal display device according to claim 28, wherein a total area sized of contact portions of said spacers with said active matrix substrate is over 1/20 but under twice a total area size of said switching elements.

31. A liquid crystal display device comprising:
  an active matrix substrate including:
    a plurality of gate lines and a plurality of signal lines that are so arrayed as to intersect each other on one main surface,
    a plurality of switching elements disposed at every intersection of said gate line and said signal line and coupled with said gate line and said signal line,
    a plurality of pixel electrodes coupled with said switching elements, and a storage capacitance line, and
  an opposite substrate including:
    a common electrode on one main surface, and
    a plurality of spacers of pillar-shaped protrusions provided between said active matrix substrate and said opposite substrate,
      wherein said spacers are disposed in a non-pixel area and in such a position that a conductive substance is not disposed,
      wherein liquid crystal material is sealed in a space between said active matrix substrate and said opposite electrode substrate,
      wherein each of said spacers assumes such an inversely tapered shape that a diameter thereof reduces simply from its distal end to its proximal end.

32. A liquid crystal display device according to claim 31, further comprising:
  cylindrical wall members disposed lower than a height of said spacers along outer peripheries of said spacers and concentrically with said spacers.

33. A liquid crystal display device comprising:
  an active matrix substrate including:
    a plurality of gate lines and a plurality of signal lines that are so arrayed as to intersect each other on one main surface;
    a plurality of switching elements disposed intersections of said gate lines and said signal lines and coupled with a corresponding one of said gate lines and a corresponding one of said signal lines;
    a plurality of pixel electrodes coupled with a corresponding one of said switching elements; and
    a plurality of storage capacitance lines;
  an opposite substrate including:
    a common electrode on a main surface; and
    a plurality of spacers of pillar-shaped protrusions provided between said active matrix substrate and said opposite substrate; and
  an aligning film disposed on each of said active matrix substrate and said opposite substrate, a pillar-shaped barrier lower than the height of said spacers disposed in an entrance-side position in an aligning processing direction of said aligning film with respect to said spacers;
  wherein said spacers are disposed in a non-pixel area and in such positions where conductive substance is not disposed;
  liquid crystal material is sealed in a space between said active matrix substrate and said opposite electrode substrate.

34. A liquid crystal display device comprising:
  an active matrix substrate including
    a plurality of gate lines and a plurality of signal lines that are so arrayed as to intersect each other on a main surface,
    a plurality of switching elements coupled with said gate lines and signal lines, and
    a plurality of pixel electrodes coupled with said switching elements;
  an opposite substrate including a common electrode on one main surface, and
  a plurality of spacers disposed in a space between said active matrix substrate and said opposite substrate,
    wherein said spacers are disposed on portions each including a boundary portion between a non-pixel portion and a pixel portion of said active matrix substrate,
    liquid crystal material is sealed in between said active matrix substrate and said opposite substrate,
    said spacers are disposed on the side of said opposite substrate, and said common electrode is disposed on said opposite substrate surface including said spacers.

35. A liquid crystal display device according to claim 34, wherein said colored layers and said spacers are disposed on said opposite substrate, and
  said spacers are constructed by stacking said plurality of colored layers.

36. A liquid crystal display device according to claim 34, wherein a total area size of contact portions of said spacers with said active matrix substrate is over 1/20 but under twice a total area size of said switching elements.

37. A liquid crystal display device according to claim 34, wherein the number of said spacers have a linear relationship with respect to the number of said switching elements.

38. A liquid crystal display device comprising:
  an active matrix substrate including
    a plurality of gate lines and a plurality of signal lines that are so arrayed as to intersect each other on a main surface,
    a plurality of switching elements coupled with said gate lines and signal lines, and
    a plurality of pixel electrodes coupled with said switching elements;
  an opposite substrate including a common electrode on one main surface; and
  a plurality of spacers disposed in a space between said active matrix substrate and said opposite substrate,
    wherein said spacers are disposed on portions each including a boundary portion between a non-pixel portion and a pixel portion of said active matrix substrate, liquid crystal material is sealed in between said active matrix substrate and said opposite substrate, and each of said spacers has such an inversely tapered shape that a diameter thereof reduces simply from its distal end to its proximal end.

39. A liquid crystal display device according to claim 38, further comprising:

cylindrical wall members disposed lower than a height of said spacers along outer peripheries of said spacers and concentrically with said spacers.

40. A liquid crystal display device comprising:

an active matrix substrate including a plurality of gate lines and a plurality of signal lines that are so arrayed as to intersect each other on a main surface, a plurality of switching elements coupled with said gate lines and signal lines, and a plurality of pixel electrodes coupled with said switching elements;

an opposite substrate including a common electrode on a main surface, a plurality of spacers of pillar-shaped protrusions disposed in a space between said active matrix substrate and said opposite substrate, and an aligning film disposed on each of said active matrix substrate and said opposite substrate, and a pillar-shaped barrier lower than the height of said spacer disposed in an entrance-side position in an aligning processing direction of said aligning film with respect to said pillar-shaped spacer, wherein said spacers are disposed on portions each including a boundary portion between a non-pixel portion and a pixel portion of said active matrix substrate, and liquid crystal material is sealed in between said active matrix substrate and said opposite substrate.

41. A liquid crystal display device comprising:

an active matrix substrate including:

a plurality of semiconductor layers disposed on a main surface, a plurality of gate lines disposed over said semiconductor layer with a first insulating film interposed therebetween, a second insulating film disposed thereon, a plurality of pixel electrodes disposed over said second insulating film with a third insulating film interposed therebetween, a plurality of signal lines disposed on said second insulating film, drain electrodes which are connected via first through-holes formed in said first and second insulating films to said semiconductor layers and said pixel electrodes connected to source electrodes through second through-holes disposed in said third insulating film, said drain electrodes being connected to said signal lines;

an opposite substrate including a common electrode formed on a main surface, liquid crystal material sealed in between said active matrix substrate and said opposite substrate, main surfaces of which being disposed in a face-to-face relationship, and a plurality of spacers of pillar-shaped protrusions for maintaining distance between said active matrix substrate and said opposite substrate.

42. A liquid crystal display device according to claim 41, wherein said spacers are disposed over said gate lines that are defined as intermediate wiring layers, and in such positions where no conductive substance is formed.

43. A liquid crystal display device according to claim 41, wherein said spacers are formed in the same step as a step of forming said third insulating film.

44. A liquid crystal display device according to claim 43, wherein said third insulating film is composed of a colored layer, and said spacers are constructed by stacking a plurality of colored layers.

45. A liquid crystal display device according to claim 41, further comprising a plurality of colored layers disposed on said opposite substrate, when said spacers are constructed by stacking said plurality of colored layers, and said common electrode is disposed on said substrate including said colored layers and said spacers.

46. A liquid crystal display device according to claim 41, wherein a total area size of the contact portions of said spacers with said active matrix substrate is over 1/20 but under twice a total area size of said switching elements.

47. A liquid crystal display device according to claim 41, wherein the number of said spacers have a relationship of linear function with respect to the number of said switching elements.

48. A liquid crystal display device according to claim 41, wherein each of said spacers assumes such an inversely tapered shape that a diameter thereof reduces simply from its distal end to its proximal end.

49. A liquid crystal display device according to claim 41, wherein said semiconductor layers are made of polysilicon.

50. A liquid crystal display device according to claim 49, further comprising a driver portion of said liquid crystal device, wherein said semiconductor layers are formed simultaneously with said driver portion.

51. A liquid crystal display device according to claim 41, wherein said spacers are made of resin.

52. A liquid crystal display device according to claim 41, wherein said third insulating layer is surface-flattened insulating film.

53. A liquid crystal display device according to claim 41, wherein said signal lines are mainly composed of aluminum.

54. A liquid crystal display device according to claim 41, wherein said second insulating layer comprises silicon oxide.

55. A liquid crystal display device comprising:

an active matrix substrate including a plurality of thin film transistors, each of the transistors including a semiconductor layer, a gate electrode disposed over said semiconductor layer with a first insulating film interposed therebetween, a second insulating film disposed thereon and drain and source electrodes disposed on said second insulating film, said drain electrodes being connected via a first through-hole formed in said first and second insulating films to said semiconductor layer, a pixel electrode disposed over said second insulating film with a third insulating film interposed therebetween, said pixel electrode being connected to said source electrodes through a second through-hole in said third insulation film, a plurality of signal lines disposed on said second insulating film, each of said signal lines being connected to said drain electrodes, a plurality of gate lines disposed on said first insulating film, one of said gate lines being connected to said source electrode;

an opposite substrate arranged on said substrate in a face-to-face relationship, liquid crystal material sealed between said active matrix substrate and said opposite substrate, and a plurality of pillar-shaped spacers for maintaining the space between said active matrix substrate and said opposite substrate.

56. A liquid crystal display device according to claim 55, wherein said each of said active matrix and opposite substrates has a glass and said pixel electrode is made of indium tin oxide.

57. A liquid crystal display device according to claim 55, wherein said second insulating layer is made of silicon compound and said third insulating layer is a surface-flattened insulating film.

58. A liquid crystal display device according to claim 55, wherein said second insulating layer is composed of silicon oxide and silicon nitride films.

* * * * *